(12) United States Patent
Sagawa et al.

(10) Patent No.: US 7,096,087 B2
(45) Date of Patent: Aug. 22, 2006

(54) METHOD AND APPARATUS FOR AUTOMATICALLY PRODUCING A MACHINING PROGRAM

(75) Inventors: Takanobu Sagawa, Warabi (JP); Akihide Kanaya, Gyoda (JP)

(73) Assignee: Citizen Watch Co., Ltd., Tokyo (JP)

( * ) Notice: Subject to any disclaimer, the term of this patent is extended or adjusted under 35 U.S.C. 154(b) by 149 days.

(21) Appl. No.: 10/926,303

(22) Filed: Aug. 26, 2004

(65) Prior Publication Data
US 2005/0038552 A1 Feb. 17, 2005

Related U.S. Application Data

(62) Division of application No. 10/168,824, filed as application No. PCT/JP01/09453 on Oct. 26, 2001, now Pat. No. 6,804,575.

(30) Foreign Application Priority Data

| Oct. 26, 2000 | (JP) | ............................. 2000-327569 |
| Oct. 26, 2000 | (JP) | ............................. 2000-327579 |
| Oct. 26, 2000 | (JP) | ............................. 2000-327654 |

(51) Int. Cl.
   *G06F 19/00* (2006.01)
(52) U.S. Cl. ..................................... 700/160
(58) Field of Classification Search ................ 700/106, 700/117, 160, 179, 181; 706/3; 438/11; 76/13, 904
   See application file for complete search history.

(56) References Cited

U.S. PATENT DOCUMENTS 6,401,004 B1   6/2002  Yamazaki et al. .......... 700/159
6,556,879 B1 * 4/2003  Matsumoto et al. .......... 700/86
6,671,571 B1 * 12/2003 Matsumiya et al. ........ 700/172
2005/0217441 A1 * 10/2005 Shinohara et al. ........... 82/1.11

FOREIGN PATENT DOCUMENTS

| JP | 62-208858 | 9/1987 |
| JP | 1-180009  | 7/1989 |
| JP | 3-54006   | 5/1991 |
| JP | 3-188507  | 8/1991 |
| JP | 7-295619  | 11/1995 |

\* cited by examiner

*Primary Examiner*—Leo Picard
*Assistant Examiner*—Chad Rapp
(74) *Attorney, Agent, or Firm*—Finnegan, Henderson, Farabow, Garrett & Dunner, L.L.P.

(57) ABSTRACT

A method and apparatus able to quickly and accurately automatically produce machining programs for complicated shapes of products without being affected by the level of knowledge or experience of the operator. A cutting-condition determination processing unit (20) of an automatic programming apparatus (10) specifies required standard cutting condition data from the type of material and the types of processes designated by an input unit (12) in a cutting condition data table (24) stored in a storage unit (18), specifies the tool data corresponding to the types of tools designated by the input unit in the tool data table (26) stored in the storage unit, and determines the cutting conditions relating to the type of material and the tools from the standard cutting condition data and the tool data. A program-generation processing unit (22) specifies a program-generation algorithm corresponding to the designated process in an algorithm table (28) stored in the storage unit and generates machining programs based on the determined cutting conditions in accordance with the program-generation algorithm.

10 Claims, 31 Drawing Sheets

Fig. 3

| | | |
|---|---|---|
| PROGRAM NO. | O | 401 |
| COMMENT | | test1 |
| GROUP | | |

UNIT SYSTEM
● MILLIMETER (mm)
○ INCH (inch)

BASIC DATA

| | | | | | |
|---|---|---|---|---|---|
| MATERIAL | 1. ALUMINUM (A****), BRASS (C36**) | | NUM. CORNER | 0 | |
| BAR TYPE | 1. ROUND | | PIPE I.D. | 0 | mm |
| BAR O.D. | 12.0 | mm | WORKPIECE LENGTH | 50.0 | mm |
| O.D. + POS. PT | 1.0 | mm | CUT-OFF END PT | -3.0 | mm |
| PCS./CHUCK | 1 | pcs. | CUT-OFF TOOL SEL. | | |
| CUT-OFF TL NAME | | | HOLDER NAME | | |
| CUT-OFF TL NO. | 0100 | | | | |
| FRONT MACH HOLDER | STANDARD (GTF5010) | | BACK DRILL HOLDER NAME | STANDARD | |

☑ M/SP C-AXIS   ☐ B/SP C-AXIS   ☐ LONG WORKPIECE

RE-CHUCKING SET

CREATE    CANCEL

0410(test)

| | |
|---|---|
| | 0001 <PREPARATION> |
| | 0002 <OD TURNING> |
| | 0003 <OD THREAD CUTTING> |
| | 0004 <D CUT> |
| | 0005 <CROSS CENTERING> |
| | 0006 <CROSS DRILLING> |
| | 0007 <CUT-OFF/PICK-OFF> |
| | 0008 <FACE CENTERING> |
| | 0009 <FACE DRILLING> |
| | 0010 <FACE TAPPING> |
| | 0011 <OD TURNING> |
| | 0012 <BACK SPINDLE SEPARATION> |
| | 9999 <END> |

| BASIC DATA | |
|---|---|
| MATERIAL | ALUMINUM (A****), BRASS (C36**) |
| TOOL | <FRONT TURNING> --> IL1300 |
| BAR O.D. | 12.0 mm |

IN-FEED  >= 4 mm  ▼

CUTTING CONDITIONS

SPINDLE SPEED  S  5300  $min^{-1}$

FEED RATE  Z DIREC.  0.03  mm/rev   X DIREC.  0.03  mm/rev
CHAMFERING  0.1  mm/rev

STANDARD    OK    CANCEL

| Field | Value |
|---|---|
| PROGRAM NO. | O 401 |
| COMMENT | test1 |
| GROUP | |

BASIC DATA

| Field | Value |
|---|---|
| UNIT SYSTEM | ◉ MILLIMETER (mm)  ○ INCH (inch) |
| MATERIAL | 1. ALUMINUM (A****), BRASS (C36**) |
| BAR TYPE | 1. ROUND |
| BAR O.D. | 12.0 mm |
| O.D. + POS. PT | 1.0 mm |
| PCS./CHUCK | 1 pcs |
| NUM. CORNER | 0 |
| PIPE I.D. | 0 mm |
| WORKPIECE LENGTH | 50.0 mm |
| CUT-OFF END PT | -3.0 mm |
| CUT-OFF TL NAME | CUT-OFF TOOL SEL. |
| CUT-OFF TL NO. | 0100 |
| FRONT MACH HOLDER | STANDARD (GTF50101) |
| HOLDER NAME | |
| BACK DRILL HOLDER NAME | STANDARD |
| ☑ M/SP C-AXIS | ☐ B/SP C-AXIS  ☐ LONG WORKPIECE |

[RE-CHUCKING SET]  [CREATE]  [CANCEL]

| SLEEVE HOLDER | COMBINATION | ROTARY TOOL 1 | ROTARY TOOL 2 |

| FOR GANG | TOOL HOLDER 1 | TOOL HOLDER 2 |

(NUM)

☑ VTF110 TOOL HOLDER (STANDARD) — 5
☑ VTF210 TOOL HOLDER (10 mm SHIFT) — 5
☑ VTF310 TOOL HOLDER (20 mm SHIFT) — 5
☑ VTF410 TOOL HOLDER (REVERSE ROTATION 20 mm SHIFT) — 5
☑ VTF510 TOOL HOLDER (REVERSE ROTATION) — 5
☑ VTF610 TOOL HOLDER (REVERSE ROTATION 10 mm SHIFT) — 5
☑ VTF113 TOOL HOLDER (THROW-AWAY) — 5
☐ VTF1310 TOOL HOLDER (BACK MACHINING CUT-OFF) — 5
☐ VTF1410 TOOL HOLDER (BACK MACH. CUT-OFF 10 mm SHIFT) — 5

OK   CANCEL

| GANG TOOL | TURRET | BACK 3 SP | | |
|---|---|---|---|---|
| TNo. | HLDR NAME | TOOL KIND | TOOL NAME | |
| 01 | | CUT-OFF (RH) | IL3320 | |
| 02 | | FRONT TURNING | IL1300 | |
| 03 | | | | |
| 04 | | | | |
| 05 | | | | |
| 06 | GSC607 | END MILL | IF7250 | |
| 07 | GSC607 | CENTER DRILLING | JIS-1-1.5×90 | |
| 08 | GSC607 | DRILL | D2.3 | |

SET

OK   CANCEL

METHOD AND APPARATUS FOR AUTOMATICALLY PRODUCING A MACHINING PROGRAM

CROSS REFERENCE TO RELATED APPLICATIONS

This application is a divisional of application Ser. No. 10/168,824 filed Jun. 25, 2002 now U.S. Pat. No. 6,804,575, which is a §371 of International Application No. PCT/JP01/09453 filed Oct. 26, 2001, the contents of both of which are incorporated herein by reference.

TECHNICAL FIELD

The present invention relates to a method and apparatus for automatically producing a machining program to be executed by a machine tool. More particularly, the present invention relates to a method and apparatus for automatically producing a multi-line control program to be executed by an NC (numerical control) machine tool having at least one spindle and at least one tool rest both operable under control of a plurality of lines.

BACKGROUND ART

In recent years, in the field of NC machine tools, progress has been made in multiple function machining enabling complicated and diverse shapes of products to be automatically machined by providing turning tools, drills, mills, and other various types of tools exchangeably on tool rests and enabling execution of turning, drilling, milling, and other various machining processes using them.

Further, in NC lathes and other automatic lathes (that is, lathes able to automatically perform machining), multi-function type NC lathes designed to shorten the machining time by centrally placing at least one spindle and at least one tool rest, both operable under the control of a plurality of lines, on a single lathe bed to enable simultaneous different types of machining (for example, outer diametrical cutting and boring) on the same workpiece (for example, bar) or simultaneous machining of different workpieces.

Note that the term "line" means a combination of a group of control axes controlled by a single machining program (including case of only one control axis). When it is possible to set a plurality of types of combinations of groups of control axes on a single NC machine tool, the control system in that NC machine tool is generally called "multi-line control (or multi-path control)".

When trying to perform various types of machining processes simultaneously or in a desired order on a single workpiece in such a multiple function machining NC machine tool, the work of producing the series of machining programs and registering them in the NC device requires advanced programming skills, so tends to place a considerable burden on the operator.

On the other hand, in the field of NC machine tools, various configurations of automatic programming apparatuses provided in relation to NC devices have been proposed to reduce the labor demanded from the operator at the time of preparing the machining programs. This type of automatic programming apparatus usually is provided with a CPU, memory, keyboard, display, etc. and is designed to acquire the data required for executing machining processes from dialog type instructions and input data from the operator for various selection items or required items displayed in order on the display and, if necessary, geometric data of the machined product input by a drawing format through a graphic input device such as a CAD system and to use this to automatically produce the required machining programs. According to this automatic programming apparatus, the work of the operator inputting the machining programs by phrases is eliminated, so even an operator with inferior programming skills can prepare complicated machining programs in a relatively short time.

In the above conventional automatic programming apparatus, while the time of production of machining programs by the operator is effectively shortened, the various data required for the programming is judged and set by the operator with reference to the design drawings of the machined product, so sufficient knowledge about the machining processes or tool attributes is required from the operator.

For example, when producing a series of machining programs for executing the various automatic cutting processes for a single machined product using a multi-spindle, multi-line control type NC lathe provided with a plurality of types of tools on a plurality of tool rests, the operator has to read the types of processes required for the machining from the design drawings of the machined product and, while considering the material of the workpiece, suitably judge, set, and input the data required for each machining range in the individual processes (such as types of tools, movement positions of noses, relative cutting speeds of noses and/or relative feed rate of tool rests). In particular, data relating to the cutting conditions such as the cutting speed and the feed rate vary in most suitable values in accordance with the tool nose and the material of the workpiece. The accuracy of judgement and the resultant machining accuracy tend to be governed by the level knowledge or experience of the operator.

Further, when producing a multi-line control program for executing various automatic cutting processes on a single machined product by such a multi-spindle, multi-line control type NC lathe in parallel by a plurality of lines, the operator is required to read the types of processes required for the machining from the design drawings and then suitably judge and design what line and at what time to execute the individual processes would be most advantageous in terms of work efficiency. In particular, when attaching designated tools to be used in the cutting processes on the tool mounts of the tool rests, it is sometimes necessary to use special tool holders depending on the types of the designated tools or the configurations of the tool rests. In that case, however, the operator must decide how to allocate and attach the plurality of designated tools to the plurality of tool mounts provided on a single tool rest with reference to the numbers of the plurality of types of tool holders in stock for the different types and their attributes (such as types of mountable tool rests, types of processes used for and/or attributes of tools for use).

In this way, to produce a highly efficient multi-line control program by the conventional automatic programming apparatus, the operator was required to be fully knowledgeable about the machine configuration of the NC machine tool covered and maintain an accurate grasp of the attributes of the plurality of types of tool holders able to be used in that NC machine tool and the numbers in stock and then suitably allocate and designate attachment locations of the plurality of designated tools to the plurality of tool mounts of one or more tool rests. As a result, a tremendous amount of time and effort is spent on producing the multi-line control program. Further, the quality of the automatically produced multi-line control program (such as length of cycle time, appropriateness of tool management and/or machining accuracy) tends to be remarkably affected by the level of knowledge or experience of the operator.

Further, in the conventional automatic programming apparatus, when the operator checks the content of the produced machining programs, the troublesome work is required of displaying and reading the series of blocks describing the machining programs on a display. With check work of such a program display method, it was hard to obtain a grasp of the time spent for the individual processes and difficult to optimize the programming for shortening the machining time. Further, judging whether the order of execution of the plurality of processes for producing a single machined product can be changed for streamlining the machining work or predicting the impact of a change in the order of processing on the series of machining programs as a whole was extremely difficult with the conventional program display method.

DISCLOSURE OF THE INVENTION

Therefore, an object of the present invention is to provide an automatic programming method and an automatic programming apparatus enabling a series of machining programs for automatically machining complicated and diverse shapes of machined products by a multiple function machining NC machine tool to be quickly and accurately automatically produced without being affected by the level of knowledge or experience of the operator.

Another object of the present invention is to provide an automatic programming method and an automatic programming apparatus enabling the plurality of processes required for production of a machined product to be efficiently and suitably automatically allocated to a plurality of lines when automatically producing a multi-line control program to be executed by a multi-spindle, multi-line control type NC machine tool and thereby enabling a high quality multi-line control program to be quickly automatically produced without being affected by the level of knowledge or experience of the operator.

Still another object of the present invention is to provide a program display processing method able to be effectively used in the art of automatic programming, which program display processing method enables an operator to easily check the contents of a series of machining programs for executing a plurality of processes or the time to be spent by the individual processes or changing the order of execution of these processes.

To achieve the above objects, the present invention, in a first aspect, provides an automatic programming method for automatically producing a machining program to be executed in an NC machine tool, comprising previously setting and registering a plurality of standard cutting condition data relating to cuttings conditions required in a plurality of types of cutting processes capable of being performed in an NC machine tool, the plurality of standard cutting condition data being prepared respectively for the plurality of types of cutting processes and individually corresponding to a plurality of kinds of material of workpieces; previously registering a plurality of tool data relating to attributes of a plurality of types of tools capable of being used in the plurality of types of cutting processes; previously setting and registering a plurality of program generating algorithms used for generating machining programs for executing the plurality of types of cutting processes, the plurality of program generating algorithms being prepared respectively for the plurality of types of cutting processes; selecting and designating a kind of material of a workpiece, a type of at least one of the cutting processes performed for the workpiece, and a type of tool used in each of the at least one of the cutting processes; specifying standard cutting condition data corresponding to each of the at least one of the cutting processes, among the plurality of standard cutting condition data as previously registered, on the basis of the kind of material of the workpiece as designated and the type of at least one of the cutting processes as designated, specifying tool data corresponding to the type of the tool as designated, among the plurality of sets of tool data as previously registered, and determining a cutting condition required in association with the kind of material and the tool in each of the at least one of the cutting processes, on the basis of the standard cutting condition data as specified and the tool data as specified; and specifying a program generating algorithm corresponding to each of the at least one of the cutting processes as designated, among the plurality of program generating algorithms as previously registered, and generating a machining program for each of the at least one of the cutting processes, on the basis of the cutting condition as determined, in accordance with the program generating algorithm as specified.

An automatic programming method according to a preferred embodiment further comprises, prior to the generating of the machining program, previously setting and registering a plurality of standard machining conditions required in the plurality of types of cutting processes, the plurality of standard machining conditions being prepared respectively for the plurality of types of cutting processes, and specifying a standard machining condition required in each of the at least one of the cutting processes, among the plurality of standard machining conditions as previously registered, on the basis of the type of at least one of the cutting processes as designated; wherein the machining program is generated by using the standard machining condition as specified.

In this configuration, it is advantageous that the standard machining condition be freely changeable.

Further, the above automatic programming method preferably further comprises, prior to the generating of the machining program, registering, in response to a requirement, supplementary data individually required corresponding to the type of at least one of the cutting processes as designated; wherein the machining program is generated by using the supplementary data as registered.

In this configuration, it is advantageous that the supplementary data be registered by a drawing.

Further, the above automatic programming method preferably further comprises, prior to the determining of the cutting condition, previously setting and registering a cutting condition calculating expression for calculating the cutting condition on the basis of the standard cutting condition data as specified and the tool data as specified, the cutting condition calculating expression being prepared respectively for the plurality of types of cutting processes; wherein the cutting condition is determined in accordance with the cutting condition calculating expression as registered.

Further, the automatic programming method preferably further comprises, prior to the determining of the cutting condition, previously setting and registering a standard parameter for adjusting the standard cutting condition data correspondingly to an attribute of the tool, the standard parameter being prepared respectively for the attributes of tools and the plurality of kinds of material of workpieces; wherein the cutting condition is determined by using the standard parameter as registered.

Further, the automatic programming method preferably further comprises, as occasion demands, modifying the machining program as generated, by changing the cutting condition as determined.

In this configuration, it is advantageous that the method further comprise, after the changing of the cutting condition, calculating a changing parameter for enabling the cutting condition as changed for modifying the machining program to be determined on the basis of the standard cutting condition data, and registering the changing parameter in such a manner as to be prepared respectively for the attributes of tools and the plurality of kinds of material of workpieces.

In this configuration, it is advantageous that the method further comprise, prior to the determining of the cutting condition, previously setting and registering a standard parameter for adjusting the standard cutting condition data correspondingly to an attribute of the tool, the standard parameter being prepared respectively for the attributes of tools and the plurality of kinds of material of workpieces; wherein the cutting condition is determined by using the standard parameter as registered; and further comprise, in a case where the changing parameter, capable of being specified on the basis of the attribute of the tool and the kind of material of the workpiece as designated, is registered, determining the cutting condition by using the changing parameter instead of the standard parameter capable of being specified on the basis of a same attribute of the tool and a same kind of material of the workpiece, whenever the machining program is automatically produced.

In this configuration, it is advantageous that either one of the standard parameter and the changing parameter, which are capable of being specified on the basis of mutually identical attributes of the tool and mutually identical kinds of material of the workpiece, be selected to determine the cutting condition.

The standard cutting condition data may include data of relative cutting speed between a cut point on the workpiece and a nose of the tool as well as data of relative in-feed between the workpiece and the tool.

In this configuration, in a case where the type of at least one of the cutting processes as designated is a turning process, the cutting condition may include a speed of a spindle for rotating the workpiece as well as a relative in-feed between the workpiece and the tool.

Further, in a case where the kind of the tool as designated is a rotary tool, the cutting condition may include a speed of the rotary tool as well as a relative in-feed between the workpiece and the rotary tool.

The present invention, in another aspect, provides an automatic programming apparatus for automatically producing a machining program to be executed in an NC machine tool, comprising a storage unit previously storing various tables including a cutting condition table into which a plurality of standard cutting condition data, relating to cutting conditions required in a plurality of types of cutting processes capable of being performed in an NC machine tool, are set and registered, the plurality of standard cutting condition data being prepared respectively for the plurality of types of cutting processes and individually corresponding to a plurality of kinds of material of workpieces, a tool data table into which a plurality of sets of tool data, relating to attributes of a plurality of types of tools capable of being used in the plurality of types of cutting processes, are registered, and an algorithm table into which a plurality of program generating algorithms, used for generating machining programs for executing the plurality of types of cutting processes, are set and registered, the plurality of program generating algorithms being prepared respectively for the plurality of types of cutting processes; as well as various screens, associated with the various tables, including a material designation screen showing names of the plurality of kinds of material of workpieces, a process designation screen showing names of the plurality of types of cutting processes, and a tool designation screen showing names of the plurality of types of tools; a display unit selectively displaying the various screens stored in the storage unit; an input unit accepting, in relation to the various screens displayed in the display unit, designations of a kind of material of a workpiece, a type of at least one of the cutting processes performed for the workpiece, and a type of tool used in each of the at least one of the cutting processes; a cutting condition determination processing unit specifying and reading standard cutting condition data required in each of the at least one of the cutting processes, from the cutting condition data table stored in the storage unit, on the basis of the kind of material of the workpiece as designated through the input unit and the type of at least one of the cutting processes as designated therethrough, specifying and reading tool data corresponding to the type of the tool as designated through the input unit, from the tool data table stored in the storage unit, and determining a cutting condition associated with the kind of material and the tool, on the basis of the standard cutting condition data as read and the tool data as read; and a program generation processing unit specifying and reading a program generating algorithm corresponding to each of the at least one of the cutting processes as designated through the input unit, from the algorithm table stored in the storage unit, and generating a machining program for each of the at least one of the cutting processes, on the basis of the cutting condition as determined in the cutting condition determination processing unit, in accordance with the program generating algorithm as read.

According to a preferred embodiment, the storage unit previously stores a standard machining condition table into which a plurality of standard machining conditions, required in the plurality of types of cutting processes, are set and registered, the plurality of standard machining conditions being prepared respectively for the plurality of types of cutting processes; and the program generation processing unit specifies and reads a standard machining condition required in each of the at least one of the cutting processes, from the standard machining condition tables as previously stored in the storage unit, on the basis of the type of at least one of the cutting processes as designated through the input unit, to generate the machining program by using the standard machining condition as read.

In this configuration, it is advantageous that the standard machining condition in the standard machining condition table be freely changeable.

Further, it is preferable that the input unit accept, in response to a requirement, a registration of supplementary data individually required correspondingly to the type of at least one of the cutting processes as designated; and the program generation processing unit generate the machining program by using the supplementary data as accepted in the input unit.

In this configuration, it is advantageous that the input unit accept the registration of the supplementary data by a drawing.

Further, preferably the storage unit previously stores a cutting condition calculating expression table into which a plurality of cutting condition calculating expressions, for calculating the cutting condition on the basis of the standard cutting condition data and the tool data, are set and registered, the cutting condition calculating expressions being prepared respectively for the plurality of types of cutting processes; and the cutting condition determination processing unit specifies and reads a cutting condition calculating expression corresponding to each of the at least one of the cutting processes, from the cutting condition calculating expression table as stored in the storage unit, on the basis of the type of at least one of the cutting processes as designated through the input unit, to determine the cutting condition in accordance with the cutting condition calculating expression as read.

Alternatively, preferably the storage unit previously stores a standard parameter table into which a plurality of standard parameters, for adjusting the standard cutting condition data correspondingly to an attribute of the tool, are set and registered, the standard parameters being prepared respectively for the attributes of tools and the plurality of kinds of material of workpieces; and the cutting condition determination processing unit specifies and reads a standard parameter required in each of the at least one of the cutting processes as designated through the input unit, from the standard parameter table as stored in the storage unit, on the basis of the kind of material of the workpiece as designated through the input unit and the attribute of the tool as designated therethrough, to determine the cutting condition by using the standard parameter as read.

Further, preferably the input unit accepts, as occasion demands, a change of the cutting condition; and wherein the program generation processing unit modifies the machining program as generated, in accordance with the change of the cutting condition as accepted in the input unit.

In this configuration, it is advantageous that the cutting condition determination processing unit calculate, after the cutting condition is changed, a changing parameter for enabling the cutting condition as changed for modifying the machining program to be determined on the basis of the standard cutting condition data; and the storage unit store the changing parameter as calculated, in such a manner as to be prepared respectively for the attributes of tools and the plurality of kinds of material of workpieces.

In this configuration, it is advantageous that the storage unit previously store a standard parameter table into which a plurality of standard parameters, for adjusting the standard cutting condition data correspondingly to an attribute of the tool, are set and registered, the standard parameters being prepared respectively for the attributes of tools and the plurality of kinds of material of workpieces; wherein the cutting condition determination processing unit specifies and reads a standard parameter required in each of the at least one of the cutting processes as designated through the input unit, from the standard parameter table as stored in the storage unit, on the basis of the kind of material of the workpiece as designated through the input unit and the attribute of the tool as designated therethrough, to determine the cutting condition by using the standard parameter as read; and the cutting condition determination processing unit determine, in a case where the changing parameter, capable of being specified on the basis of the attribute of the tool and the kind of material of the workpiece as selected, is stored in the storage unit, the cutting condition by using the changing parameter instead of the standard parameter capable of being specified on the basis of a same attribute of the tool and a same kind of material of the workpiece, whenever the machining program is automatically produced.

In this configuration, it is advantageous that the cutting condition determination processing unit select either one of the standard parameter and the changing parameter, which are capable of being specified on the basis of mutually identical attributes of the tool and mutually identical kinds of material of the workpiece, to determine the cutting condition.

The standard cutting condition data may include data of relative cutting speed between a cut point on the workpiece and a nose of the tool as well as data of relative in-feed between the workpiece and the tool.

In this configuration, in a case where the type of at least one of the cutting processes as designated through the input unit is a turning process, the cutting condition may include a speed of a spindle for rotating the workpiece as well as a relative in-feed between the workpiece and the tool.

Further, in a case where the kind of the tool as designated through the input unit is a rotary tool, the cutting condition may include a speed of the rotary tool as well as a relative in-feed between the workpiece and the rotary tool.

The present invention, in a still further aspect, provides an automatic programming method for automatically producing a multi-line control program executed in an NC machine tool provided with at least one spindle and at least one tool rest, both operable under control in a plurality of lines, comprising individually preparing and previously registering a plurality of programs for controlling a plurality of processes required to manufacture a machined product in the NC machine tool, without considering allocation of the programs to the plurality of lines; previously registering tool data relating to attributes of a plurality of types of tools capable of being used in a plurality of types of cutting processes capable of being performed in the NC machine tool; previously registering tool mount data relating to positions, in the at least one tool rest, of a plurality of sets of tool mounts provided in the at least one tool rest; previously registering a tool holder data relating to attributes of a plurality of types of tool holders capable of being installed onto the tool mounts; previously setting and registering a tool management determining algorithm used for allocating mounting locations of a plurality of designated tools, designated in the plurality of programs, for the tool mounts, provided that some of the programs are executed simultaneously in at least two lines among the plurality of lines; specifying a plurality of tool mounts, as the mounting locations of designated tools, allowing execution of a program associated with the designated tools, among the plurality of tool mounts, on the basis of the tool data and the tool mount data, and selecting a plurality of tool holders used for mounting the designated tools correspondingly onto the plurality of tool mounts as specified, on the basis of the tool data and the tool holder data, in accordance with the tool management determining algorithm; and describing a command, designating the plurality of tool mounts as specified, into the plurality of programs, after the selecting of a plurality of tool holders is completed, and automatically allocating the plurality of programs to the plurality of lines.

The automatic programming method according to a preferred embodiment further comprises, prior to the allocating of the plurality of programs to the plurality of lines, selecting either one of three allocation conditions such as a preset data priority of tool management, a cycle time reduction of a multi-line control program and an improvement of machining accuracy; wherein the plurality of programs are automatically allocated to the plurality of lines under an allocation condition as selected.

Further, the above automatic programming method preferably further comprises, prior to the allocating of the plurality of programs to the plurality of lines, previously setting and registering a plurality of types of machining patterns for causing machining operations in a suitable combination of the at least one spindle and the at least one tool rest; wherein the plurality of programs are automatically allocated to the plurality of lines on the basis of some machining patterns selected from the plurality of types of machining patterns.

Further, in the automatic programming method, preferably the tool holder data includes an offset value of a tool nose inherent in each of the plurality of types of tool holders; and the method further comprises, after the selecting of the plurality of tool holders, describing a command of position compensation into the plurality of programs, on the basis of the offset value of tool nose of each of the tool holders as selected.

In the above automatic programming method, preferably the tool holder data includes numbers of the plurality of types of tool holders in stock, prepared respectively for the attributes of the holders; and the plurality of tool holders are selected under consideration of the numbers in stock.

The present invention, in still another aspect, provides an automatic programming apparatus for automatically producing a multi-line control program to be executed in an NC machine tool provided with at least one spindle and at least one tool rest, both operable under control in a plurality of lines, comprising a storage unit previously storing a plurality of programs individually prepared for controlling a plurality of processes required to manufacture a machined product in the NC machine tool, without considering allocation of the programs to the plurality of lines; tool data relating to attributes of a plurality of types of tools capable of being used in a plurality of types of cutting processes capable of being performed in the NC machine tool; tool mount data relating to positions, in the at least one tool rest, of a plurality of tool mounts provided in the at least one tool rest; tool holder data relating to attributes of a plurality of types of tool holders capable of being installed onto the tool mounts; and a tool management determining algorithm used for allocating mounting locations of a plurality of designated tools, designated in the plurality of programs, for the tool mounts, provided that some of the programs are executed simultaneously in at least two lines among the plurality of lines; a program allocation processing unit specifying a plurality of tool mounts, as the mounting locations of designated tools, allowing execution of a program associated with the designated tools, among the plurality of tool mounts, on the basis of the tool data and the tool mount data stored in the storage unit, and selecting a plurality of tool holders used for mounting the designated tools correspondingly onto the plurality of tool mounts as specified, on the basis of the tool data and the tool holder data stored in the storage unit, in accordance with the tool management determining algorithm; the program allocation processing unit describing a command, designating the plurality of tool mounts as specified, into the plurality of programs, after the selecting of a plurality of tool holders is completed, and automatically allocating the plurality of programs to the plurality of lines.

An automatic programming apparatus according to a preferred embodiment further comprises an input unit accepting a designation for selecting either one of three allocation conditions such as a preset data priority of tool management, a cycle time reduction of multi-line control program, and an improvement of machining accuracy; wherein the program allocation processing unit automatically allocates the plurality of programs to the plurality of lines under an allocation condition as selected through the input unit.

Further, preferably the storage unit previously stores a plurality of types of machining patterns for causing machining operations in a suitable combination of the at least one spindle and the at least one tool rest; and the program allocation processing unit automatically allocate the plurality of programs to the plurality of lines on the basis of some machining patterns selected from the plurality of types of machining patterns stored in the storage unit.

Further, preferably the tool holder data stored in the storage unit includes an offset value of a tool nose inherent in each of the plurality of types of tool holders; and the program allocation processing unit reads, after the selecting of the plurality of tool holders is completed, the offset value of tool nose in each of the tool holders as selected, from the tool holder data, and describes a command of position compensation into the plurality of programs, on the basis of the offset value of tool nose as read.

Further, preferably the tool holder data stored in the storage unit includes numbers of the plurality of types of tool holders in stock, prepared respectively for the attributes of the holders; and the program allocation processing unit specifies the plurality of tool mounts and selects the plurality of tool holders, under consideration of the numbers in stock read from the tool holder data.

The present invention, in still another aspect, provides a program display processing method for displaying, in a graphic screen, a multi-line control program to be executed in an NC machine tool provided with at least one spindle and at least one tool rest, both operable under control in a plurality of lines, comprising allocating a plurality of programs, for controlling a plurality of processes required to manufacture a machined product in the NC machine tool, to the plurality of lines, to produce a multi-line control program; calculating running times required in respective individual blocks in the multi-line control program; investigating queuing positions of the programs between the lines in the multi-line control program; individually calculating elapsed times from a program start-end to respective blocks in a series of the programs allocated to each of the plurality of lines; comparing the elapsed times as calculated of the blocks at last stages of all of the lines, and defining a longest elapsed time as a cycle time of the multi-line control program; calculating start times and machining times of respective the processes in each of the plurality of lines; calculating intervals between time graduations in the graphic screen, on the basis of the cycle time as defined, so as to permit the multi-line control program to be entirely displayed in a displayable area of a program displaying screen as previously provided; and respectively aligning rectangular strips, which respectively represent the processes in each of the plurality of lines, with the start times in corresponding lines, with reference to the time graduations as calculated, on the basis of the start times and the machining times as calculated, and displaying the rectangular strips in the graphic screen.

Preferably, the multi-line control program is produced according to the above automatic programming method.

In this configuration, the method further comprises, after the displaying of the rectangular strips representing the processes, changing a combination of some machining patterns as selected.

The changing of a combination of machining patterns may include selecting and designating a machining pattern after changed, on the graphic screen, among the plurality of types of machining patterns as registered, designating the rectangular strip representing the process changeable to the machining pattern as designated, and changing a machining pattern for performing the process corresponding to the rectangular strip as designated into the machining pattern as designated, to display the latter.

Further, it is advantageous that, in a case where the machining pattern after changed is a machining pattern for a simultaneous machining, the method comprise, prior to the display of the machining pattern after changed, judging whether the process corresponding to the rectangular strip as designated is suitable for simultaneous machining; wherein the machining pattern after changed is displayed only when it is judged to be suitable for simultaneous machining.

BRIEF DESCRIPTION OF THE DRAWINGS

These and other objects, features, and advantages of the present invention will become clearer from the following explanation of the preferred embodiments given in relation to the attached drawings. In the attached drawings.

FIG. 3 is a view of a material designating screen in the automatic programming apparatus of FIG. 1;

FIG. 5 is a view of a process list screen in the automatic programming apparatus of FIG. 1;

Figure 10:
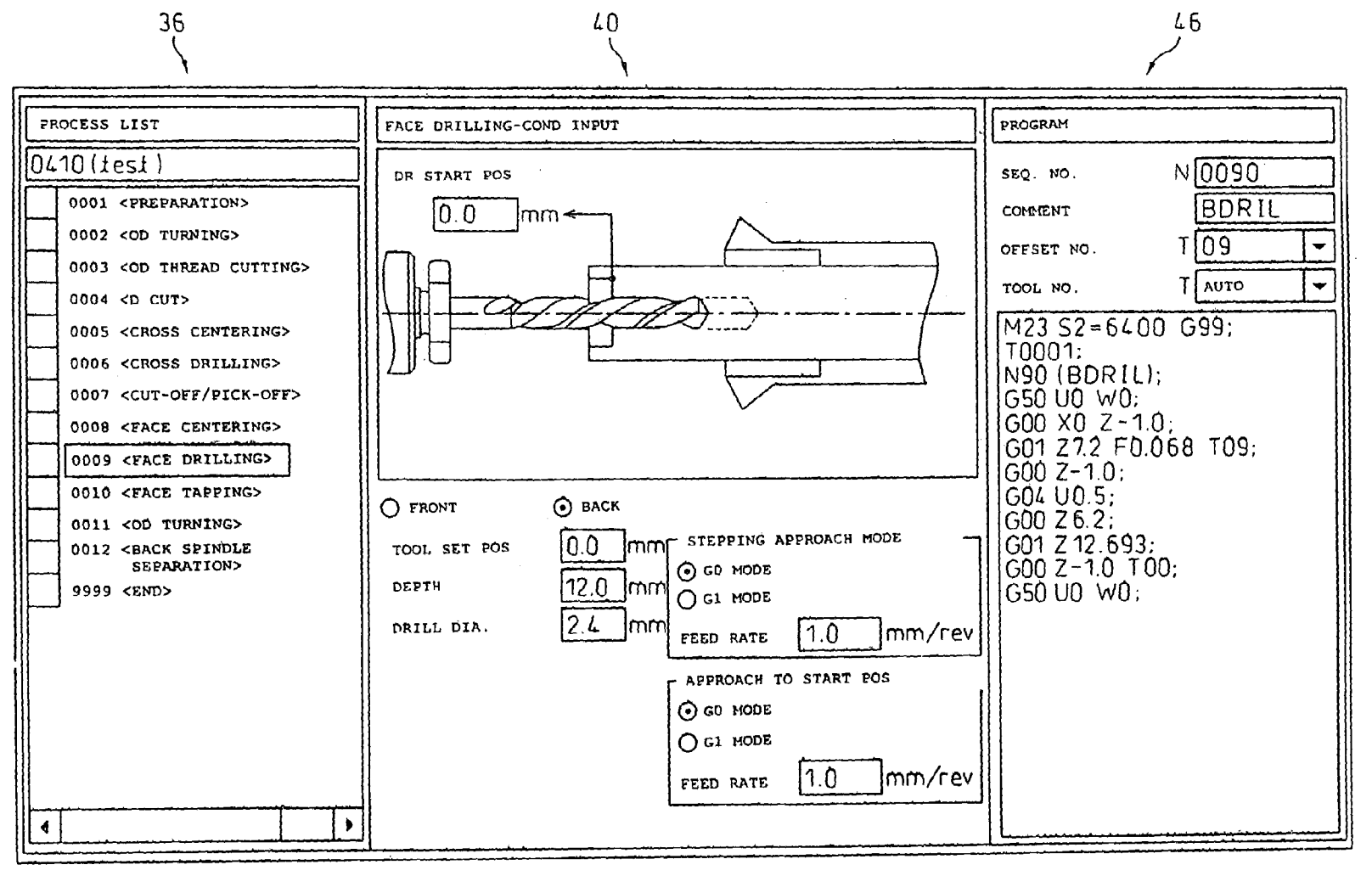

FIG. 10 is a view of a program screen in the automatic programming apparatus of FIG. 1 along with a process list screen and data input screen;

FIG. 11 is a view of a condition changing screen in the automatic programming apparatus of FIG. 1;

FIG. 16 is a view of a process list screen, data input screen, and program screen in the automatic programming apparatus of FIG. 12;

FIG. 17 is a view of a material designating screen in the automatic programming apparatus of FIG. 12;

FIG. 18 is a view of a holder stock screen in the automatic programming apparatus of FIG. 12;

FIG. 19 is a view of a tool management determining screen in the automatic programming apparatus of FIG. 12;

BEST MODE FOR CARRYING OUT THE INVENTION

Figure 1:
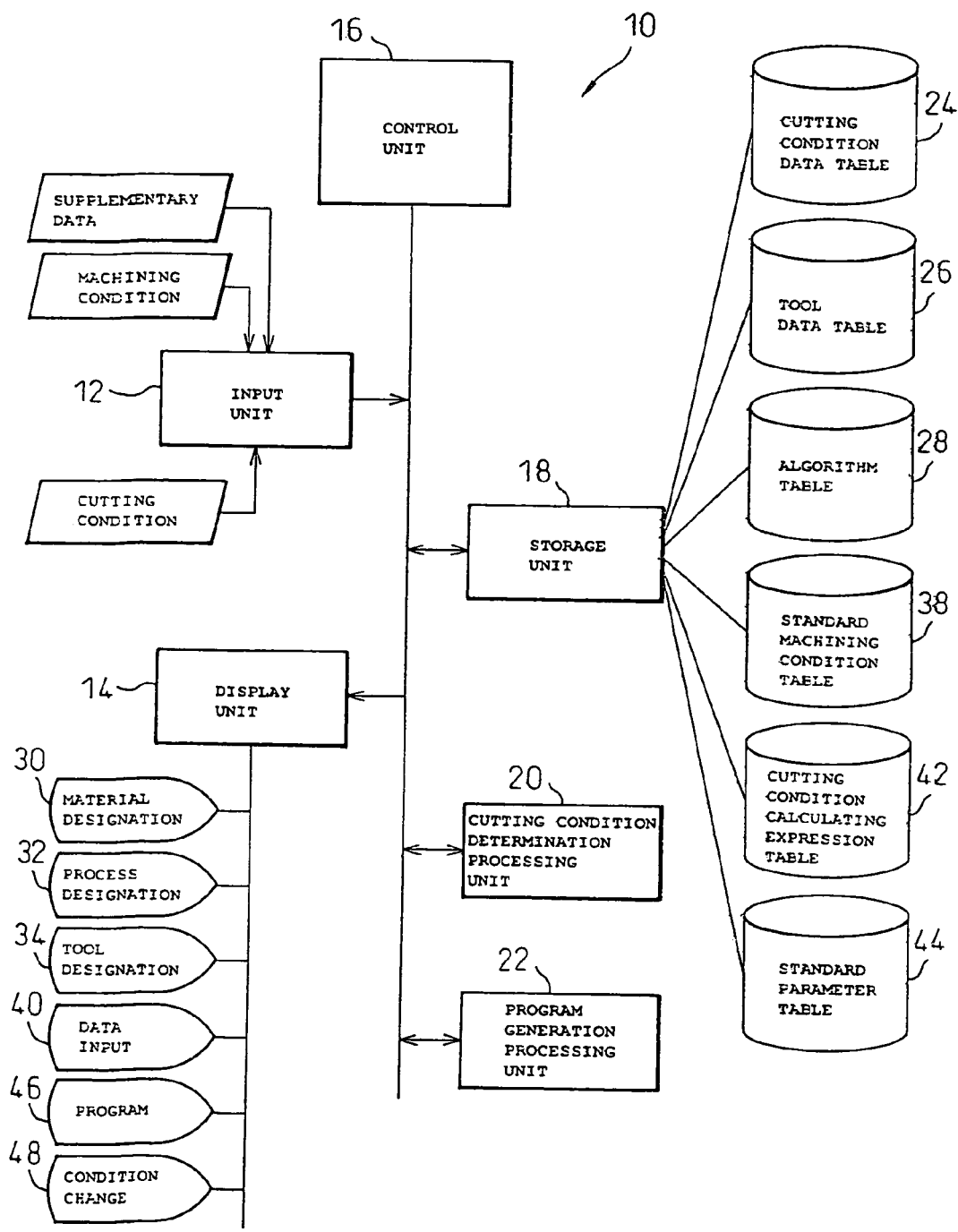
FIG. 1 is a block diagram of the configuration of an automatic programming apparatus according to a first embodiment of the present invention.
Figure 2A:
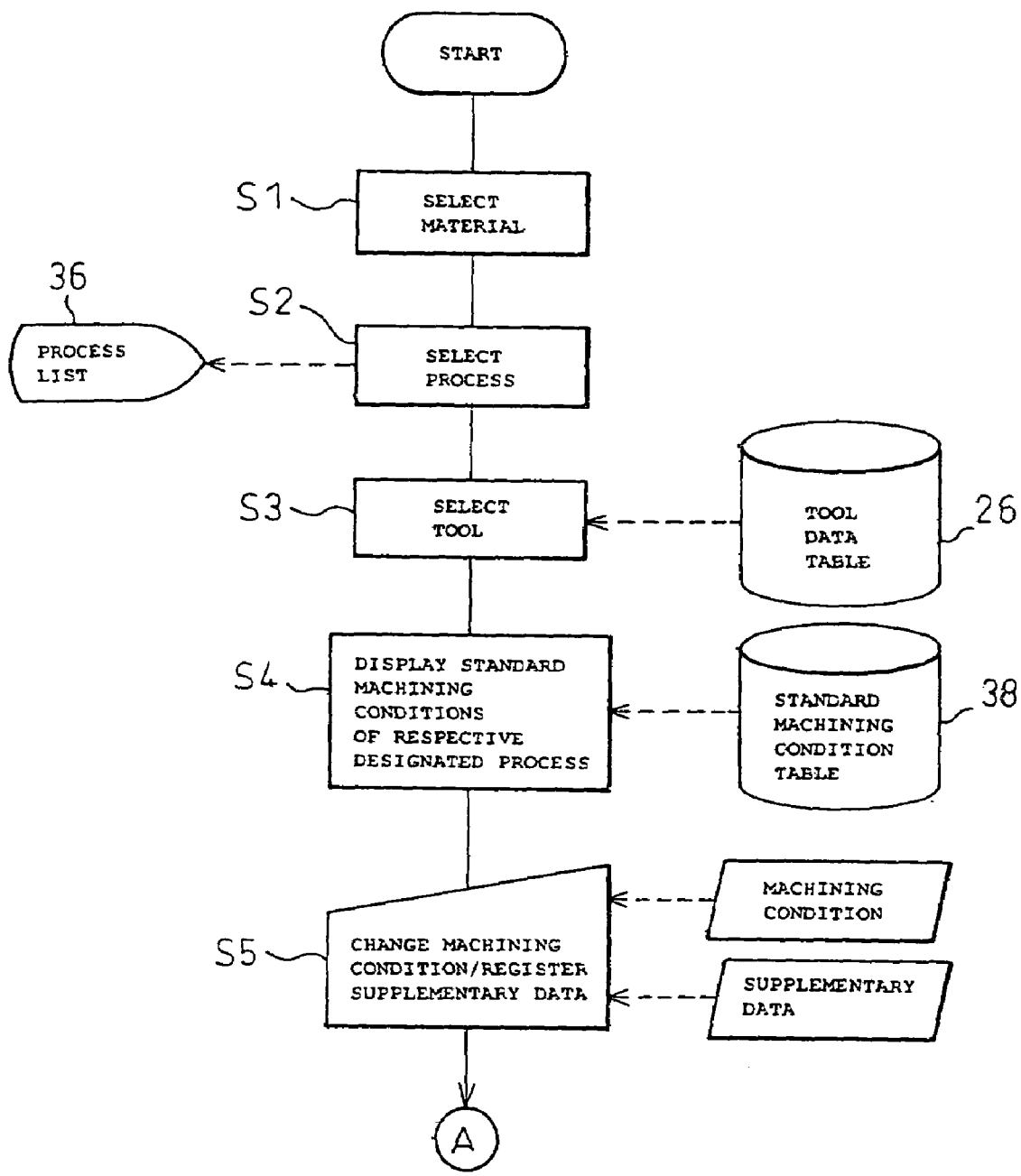
FIG. 2A and FIG. 2B are flow charts of an automatic programming method executed by the automatic programming apparatus of FIG. 1.
Figure 2B:
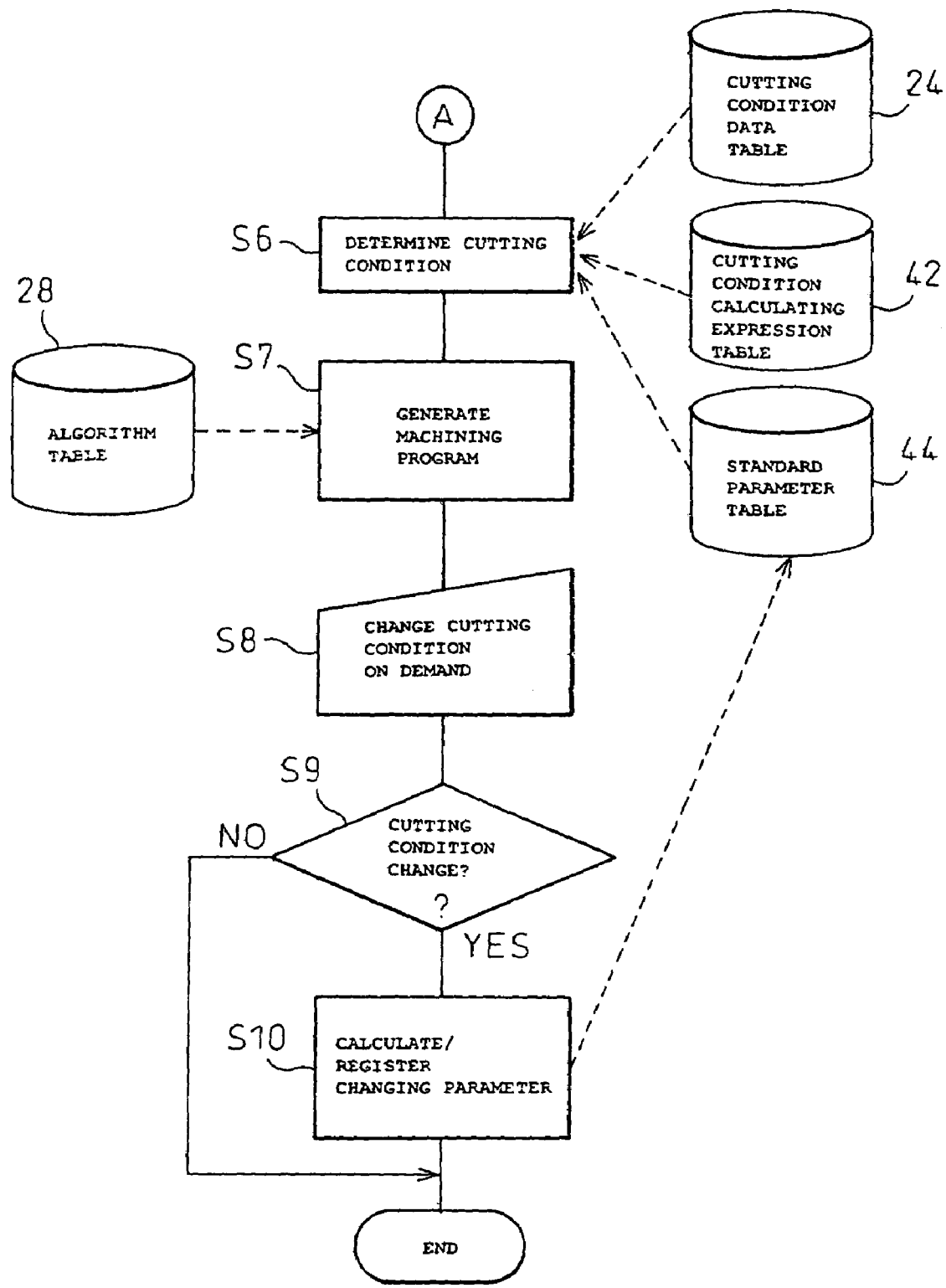
Figure 4A:
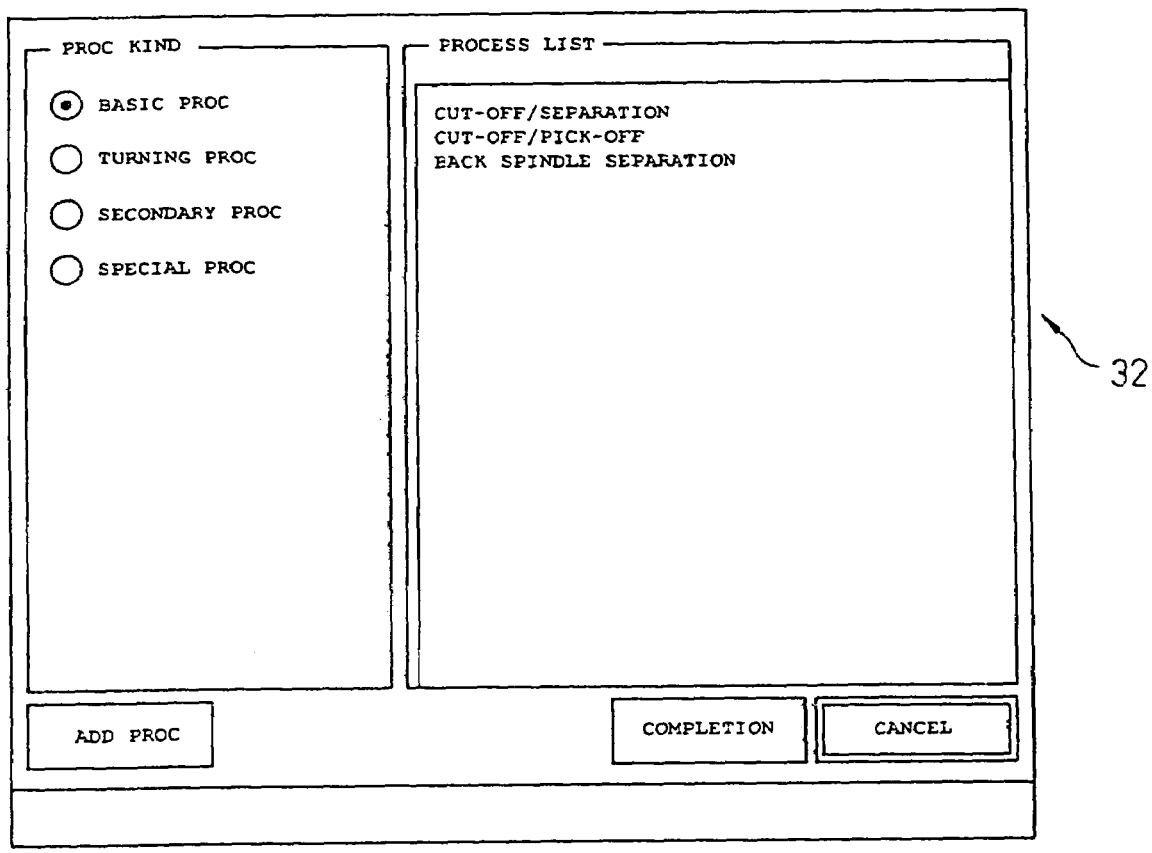
FIG. 4A and FIG. 4B are views of a process designating screen in the automatic programming apparatus of FIG. 1.
Figure 4B:
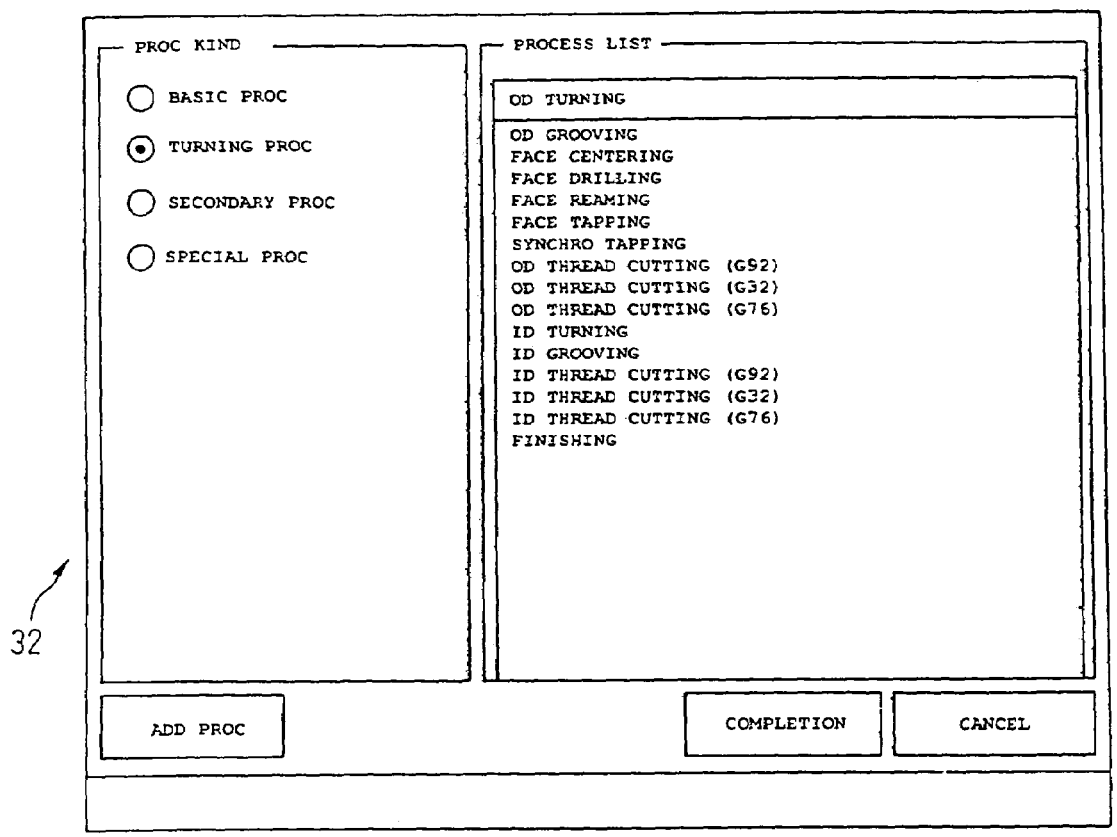
Figure 6:
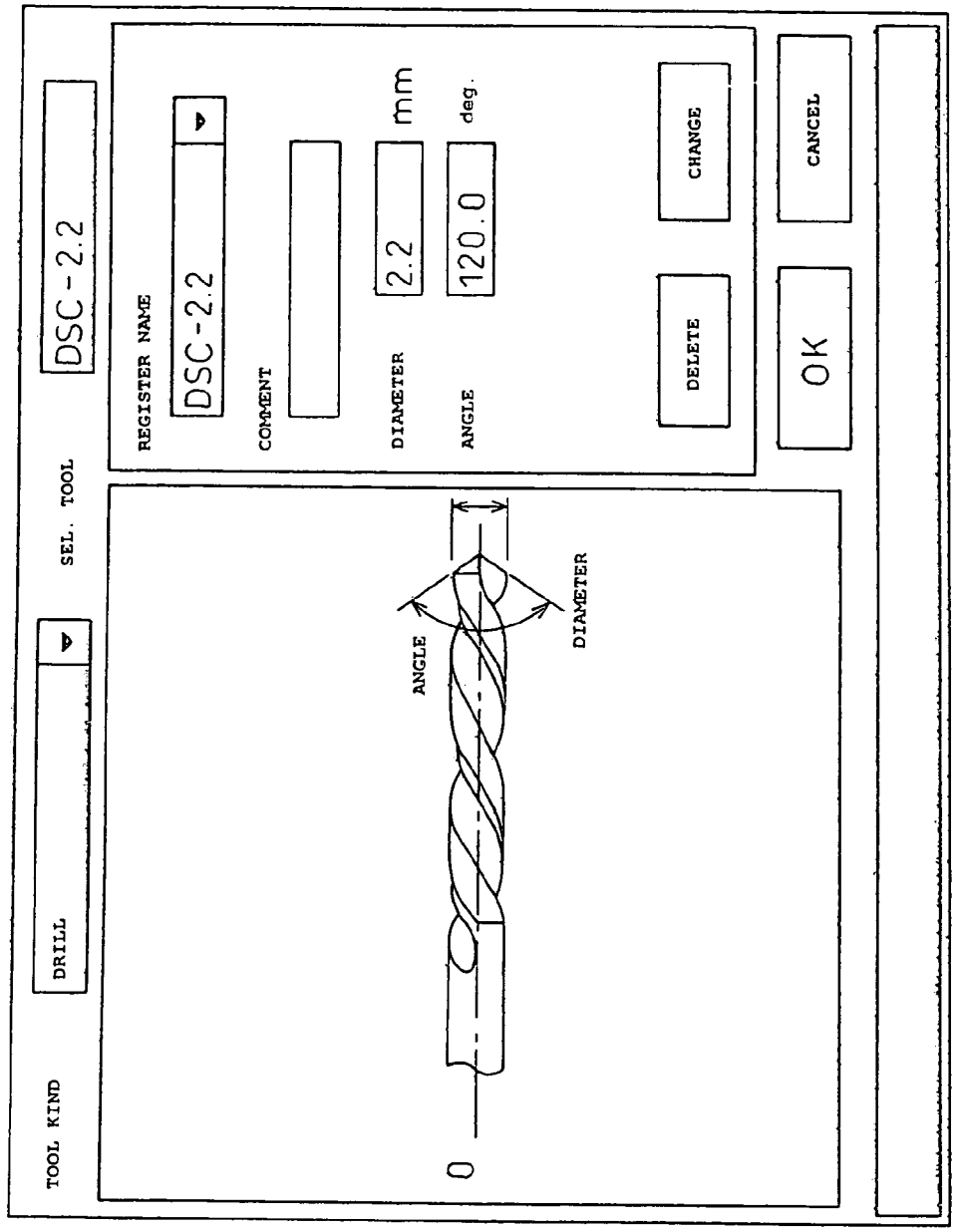
FIG. 6 is a view of a tool designating screen in the automatic programming apparatus of FIG. 1.

Referring to the figures, FIG. 1 is a block diagram of the overall configuration of an automatic programming apparatus 10 according to a first embodiment of the present invention, and FIG. 2A and FIG. 2B are flow charts of an automatic programming method according to an embodiment of the present invention executed by the automatic programming apparatus 10.

The automatic programming apparatus 10 executes the automatic programming method according to the present invention to automatically produce a series of machining programs to be executed by a not shown NC machine tool. An NC device (not shown) provided at the NC machine tool controls the operation of the NC machine tool in accordance with the series of machining programs received from the automatic programming apparatus 10. The automatic programming apparatus 10, for example, can be used well in a multi-axis, multi-line control type NC lathe centrally placing a plurality of spindles and a plurality of tool rests on a common bed and designed to enable simultaneous machining of the same material by different types of processes or simultaneous machining of different materials by turning tools, drills, mills, and other cutting tools. In this embodiment, the routine for automatic production of machining programs in such a multi-axis, multi-line control NC lathe will be explained as an example.

As shown in FIG. 1, the automatic programming apparatus 10 is provided with an input unit 12, a display unit 14, a control unit 14, a storage unit 18, a cutting condition determination processing unit 20, and a program generation processing unit 22. Explained generally, the input unit 12 has a keyboard with not shown numeric keys or a mouse or other pointing device and is designed to enable an operator to give instructions by a dialog format or input data for various selection items or required items on various screens displayed on the display unit 14, described later. Further, the input unit 12 has a graphic input function like a CAD system and is designed to allow an operator to input geometric data of a machined product by a drawing format. The display unit 14 has a not shown CRT or LCD or other display and enables input by a dialog format or input of drawings by an operator by selectively displaying various types of screens relating to various data or tables explained later stored in the storage unit 18 and by displaying the machining programs automatically produced in accordance with the later explained routine.

The control unit 16 for example has a not shown computer CPU and controls all sorts of operations relating to the automatic production of programs in the automatic programming apparatus 10 such as making the storage unit 18 store the various types of instructions or data input by the input unit 12, making the display unit 14 suitably display the above-mentioned various types of screens, and making the cutting condition determination processing unit 20 and the program generation processing unit 22 execute the various processing explained later. The storage unit 18 has a ROM, ROM, floppy disk, or other external storage medium of a not shown computer, stores in advance the various types of data, tables, screens, etc. explained later relating to automatic production of programs, and stores the tables input by the input unit 12 and the automatically produced machining programs. The cutting condition determination processing unit 20 and program generation processing unit 22 can be configured by a CPU of a not shown computer, transfer data and instructions between each other and with the input unit 12, display unit 14, and storage unit 18, and generate desired machining programs under the control of the control unit 16.

Explaining this in more detail, the storage unit 18 stores in advance various types of tables such as a cutting condition data table setting and registering a plurality of sets of standard cutting condition data relating to cutting conditions required in the plurality of types of cutting processes able to be executed in the NC machine tool for the different types of the cutting processes and for the different types of the plurality of types of materials of the workpieces, a tool data table 26 registering a plurality of sets of tool data relating to the attributes of the plurality of types of tools able to be used in the plurality of types of cutting processes, and an algorithm table 28 setting and registering a plurality of program generating algorithms for generating machining programs for executing a plurality of types of cutting processes for the different types of the cutting processes. The storage unit 18 further stores in advance, in relation to these types of tables, a material designating screen 30 displaying names of a plurality of types of material of workpieces in a designatable format, a process designating screen 32 for displaying names of various types of cutting processes in a designatable format, and a tool designating screen 34 for displaying names of a plurality of various types of tools in a designatable format. These various types of screens are selectively displayed on the display of the display unit 14 under the control of the control unit 16.

The input unit 12 receives various commands including selection and designation of the type of material of the workpiece, the types of the at least one cutting process to be performed on the workpiece, and the types of tools to be used in the at least one cutting processes through an input operation of the operator through the keyboard etc. on the various types of screens displayed on the display by the display unit 14. The various commands received by the input unit 12 are suitably handled for determining the cutting conditions at the cutting condition determination processing unit 20 and for generating the machining programs at the program generation processing unit 22 under the control of the control unit 12 as explained below.

That is, the cutting condition determination processing unit 20 specifies and reads the standard cutting condition data required for the at least one cutting process in the cutting condition data table 24 stored in the storage unit 18 from the type of material of the workpiece and the types of the at least one cutting process designated by the input unit 12, specifies and reads the tool data corresponding to the types of the tools designated by the input unit 12 in the tool data table stored in the storage unit 18, and finalizes the cutting conditions relating to the designated material and tools from the read standard cutting condition data and tool data. Further, the program generation processing unit 22 specifies and reads the program generation algorithms corresponding to the at least one cutting process designated by the input unit 12 in the algorithm table 28 stored in the storage unit 18 and generates the machining programs for the at least one cutting process based on the cutting conditions determined at the cutting condition determination processing unit 20 in accordance with the read program generation algorithms.

Next, a specific example of the automatic programming apparatus 10 and the automatic programming executed there will be explained with reference to the flow charts shown in FIG. 2A and FIG. 2B and the various types of screens shown in FIG. 3 to FIG. 11.

An NC lathe using the automatic programming apparatus 10 for example can execute various processes roughly divided in the four categories of basic processes (cut-off, separation, etc.), turning processes (outer diametrical (OD) turning, rough machining, end drilling, OD threading, inner diametrical (ID) turning, etc.), secondary processes (cross drilling, eccentric drilling, D-cutting, key grooving, etc.), special processes (long workpiece, re-chucking set, etc.) Further, in this example, the materials of the bars which can be machined by an NC lathe are roughly divided according to the differences in the cutting conditions required (cutting speed, feed rate, etc.) into aluminum and brass, fast cutting steel and carbon tool steel, fast cutting stainless steel and structural carbon steel, and alloy tool steel and nickel-chromium steel, and hard cutting materials. Note that these process classifications and material classifications are set by the user in routine machining work in accordance with the machine configuration of the NC machine tool and products covered. In the automatic programming apparatus 10, these classifications can be freely changed and added at the user side.

First, at step S1 of the flow charts of FIG. 2A and FIG. 2B, the control unit 16 selects the material of the bar covered from the five types of materials stored in advance in the storage unit 18 in accordance with the designation of the material made after the user operates the input unit 12 to make the display of the display unit 14 display the material designating screen 30. The material designating screen 30 has the screen configuration shown in FIG. 3 and is designated to not only enable the material of the covered bar in the NC lathe to be designated, but also enable the shape, dimensions, and other supplementary data of the bar to be designated by the user suitably operating the input unit 12 while referring to the material designating screen 30. In the illustrated example, a round material (outer diameter: 12 mm) comprised of aluminum or brass is designated. The material of the selected bar and the designated supplementary data are stored in the storage unit 18.

Next, at step S2, the control unit 16 selects the processes required for machining the bar of the material selected at step S1 to produce the machined product from the various processes stored in advance in the storage unit 18 in accordance with the designation of the processes after the user operates the input unit 12 to make the display of the display unit 14 display the process designating screen 32. The process designating screen 32 has the screen configuration shown in FIG. 4A and FIG. 4B and is designed to roughly divide the names of all processes able to be executed by the NC lathe into the above four classifications and enable them to be displayed in a list for each classification and to enable display of the list for each classification by the operator suitably operating the input unit 12 while referring to the process designating screen 32. For example, in FIG. 4A, basic processes are designated as the main classification, and the corresponding three types of basic processes are displayed in a list. Further, in the example of FIG. 4B, turning processes are selected as the main classification, the corresponding 16 types of turning processes are displayed in a list, and the OD turning process is designated among them. The type of the selected process is stored in the storage unit 18.

At step S2, it is possible to select a plurality of processes required for machining one machined product. At this time, the operator reads the types of processes required for the machining and their order of execution from the design drawings of the machined product and successively designates the processes on the process designating screen 32 in accordance with that order of execution. The plurality of processes designated in this way are stored in the storage unit 18 for each designation and preferably are listed on the process list screen 36 stored in advance in the storage unit 18 and displayed on a list in the display of the display unit 14 at any time. The process list screen 36 has the screen configuration shown in FIG. 5. In this example, all of the processes required for machining a single machined product are listed. Further, as illustrated, it is possible to configure the system so that each time a desired process (in the figure, the ninth face drilling) is designated, the following tool designating screen 34 is displayed if the tool selection of that process is not completed.

Next, at step S3, the control unit 16 selects the tools required at the processes selected at step S2 from the tool data table 26 stored in advance in the storage unit 18 in accordance with the designation of the tools made after the operator operates the input unit 12 to display the tool designating screen 34 on the display of the display unit 14. In this case, the system is configured so that each time one process is selected at step S2, the tool designating screen 34 for the typical tools required for that process is automatically displayed. This is advantageous in the point of enabling the input work to be speeded up and maintaining the train of thought of the operator. The tool designating screen 34 has the screen configuration shown in FIG. 6 and selectively displays the names of types and attributes of all tools registered in the tool data table 26 along with representative drawings illustrating the tools by the operator suitably operating the input unit 12 while referring to the tool designating screen 34. Here, the tool data table 26 can describe the names of the tools given by the user side for convenience (for example, to clarify the material) as registered names in relation to the names of types of tools (OD turning tool, ID turning tool, threading turning tool, drill, end mill, tap, etc.) and register the shape of the nose, dimensions, or other attributes for each registered name. In the illustrated example, "drill" is selected as the name of the type (or automatically selected by selection of the drilling process at step S2), the drill screen is displayed, the drill of the registered name DSC-2.2 is designated, and its attributes (diameter and angle of cut) are displayed.

In this way, at the stage where the selection of the material of the bar, processes, and tools is completed, the control unit 16 automatically selects the standard cutting conditions (nose position of start point, in-feed, etc.) required for executing the cutting designated by the operator and displays them on the display unit 14 for each designated process so as to enable confirmation by the operator (step S4). For that purpose, the storage unit 18 stores in advance a standard machining condition table 38 (FIG. 1) setting and registering a plurality of standard machining conditions required in the above plurality of types of cutting processes for each type of the cutting process. The standard machining conditions registered in the standard machining condition table 38 are the standard data derived from experience relating to cutting processes in the NC lathe covered. If these are used, it is possible to produce programs for executing standard machining. This automatic display of the standard machining conditions is effective in streamlining the work of the operator in inputting data.

Here, it is preferable that the user side can freely change the standard machining conditions so as to enable the user to make use of its know how and impart some sort of added value to the standard machining programs.

Further, generally, it is necessary to register supplementary data (such as depth of hole in drilling, type of thread in threading, etc.) corresponding to the types of the cutting processes in addition to these standard machining conditions. From this viewpoint, in the illustrated embodiment, the standard machining conditions selected in the standard machining condition table 38 in accordance with the type of the designated process are displayed in a changeable manner, and a plurality of types of data input screens 40 (FIG. 1) are stored in advance in the storage unit 18 for enabling registration of the supplementary data required individually corresponding to the types of the designated processes. Further, the input unit 12 is designed to accept changes in the standard machining conditions according to need and accept registration of supplementary data in accordance with request.

Figure 7:
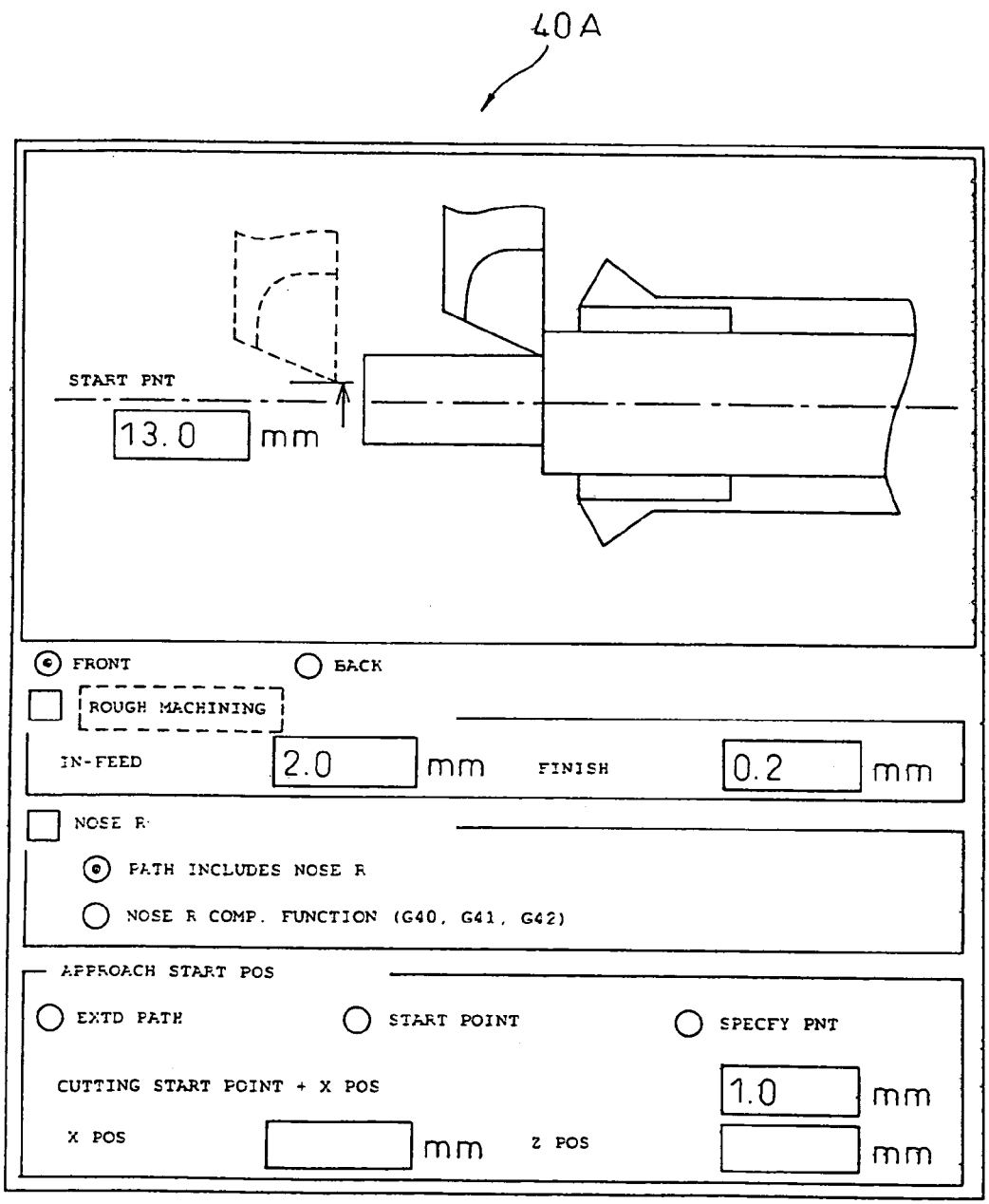
FIG. 7 is a view of a data input screen in the automatic programming apparatus of FIG. 1.

Therefore, at step S4, the display of the display unit 14 displays the data input screen 40 displaying the standard machining conditions corresponding to the designated process under the control of the control unit 16. As opposed to this, the operator operates the input unit 12 in accordance with need while referring to the data input screen 40 to change the displayed standard machining conditions or register the requested supplementary data on the data input screen 40 (step S5). The data input screen 40 has the screen configuration shown in FIG. 7 to FIG. 9 for example. For example, FIG. 7 shows the data input screen 40A corresponding to OD turning, OD grooving, rough machining, and other turning processes on the outer circumference of the bar. In the data input screen 40A, the nose position of the start point, in-feed, etc. are displayed changeably as standard machining conditions, but supplementary data is not registered. Here, in this turning process, registration of the outer shape of the machined product, that is, the cutting shape, as supplementary data is advantageous in many cases. Therefore, the input unit 12 is given a drawing input function like a CAD system and the storage unit 12 stores in advance a drawing input screen 40B shown in FIG. 8. Due to this, the operator can in accordance with need make the display unit 14 display the drawing input screen 40B and register geometric supplementary data (point coordinates on tool path, radius of arc, etc.) from the drawings. Further, the example of FIG. 9 shows a data input screen 40C corresponding to the D-cutting. In the data input screen 40C, the outer diameter of the machined part, the maximum in-feed, the cut length, etc. are displayed changeably as standard machining conditions. Further, the number of cuts, the rotational angle of the spindle at the time of cutting, the cut width, the cut start position (Z-coordinate), and the amount of cut (depth) are registered as supplementary data.

Once the confirmation and change of the machining conditions and the registration of the supplementary data are completed in this way, as explained above, the cutting condition determination processing unit 20 determines the cutting conditions relating to the designated bar and designated tools under the control of the control unit 16 (step S6). Here, in the illustrated embodiment, as shown in the following Table 1 to Table 4, the cutting condition data table 24 sets and registers the data of the relative cutting speed between the cut point of the bar and the nose of the tool and the data of the relative feed per revolution during the cutting between the bar and tool as the standard cutting condition data for each type of the various cutting processes explained above and for each of the five types of materials explained above.

For example, Table 1 and Table 2 are a cutting speed table and feed rate table in OD turning, OD grooving, rough machining, or other turning on the outer circumferential surface of the bar. In this example, the feed rate table is divided in data in accordance with the in-feed for each of the feed per revolution in the radial direction and feed per revolution in the longitudinal direction.

TABLE 1

OD cutting speed table

| Type of material | Cutting speed (m/min) |
|---|---|
| Aluminum, brass | 200.0 |
| Free cutting steel, carbon tool steel | 150.0 |
| Free cutting stainless steel, structural carbon steel | 120.0 |
| Alloy tool steel, nickel-chromium steel | 70.0 |
| Hard cutting materials | 50.0 |

TABLE 2

OD feed rate table

| | Feed (mm/rev) | | | | | |
|---|---|---|---|---|---|---|
| | More than 4 mm in-feed | | 2 to 4 mm in-feed | | Less than 2 mm in-feed | |
| Type of material | Radial | Long. | Radial | Long. | Radial | Long. |
| Aluminum, brass | 0.03 | 0.03 | 0.05 | 0.08 | 0.08 | 0.15 |
| Free cutting steel, carbon tool steel | 0.015 | 0.03 | 0.03 | 0.08 | 0.06 | 0.15 |
| Free cutting stainless steel, structural carbon steel | 0.015 | 0.03 | 0.025 | 0.05 | 0.05 | 0.1 |
| Alloy tool steel, nickel-chromium steel | 0.01 | 0.03 | 0.02 | 0.05 | 0.03 | 0.1 |
| Hard cutting materials | 0.008 | 0.02 | 0.015 | 0.04 | 0.02 | 0.08 |

Further, Table 3 and Table 4 respectively are a cutting speed table and feed rate table in a drilling process for the end face or the outer circumferential surface of a bar such as face drilling, cross drilling, or eccentric drilling. In this example, both the cutting speed table and the feed rate table are divided in data accordance with the diameter dimensions of the tools (drills). Further, the feed rate table shows data of not the feed per revolution itself, but two coefficients.

TABLE 3

Drill cutting speed table

| | Cutting speed (m/min) | | |
|---|---|---|---|
| Type of material | Drill diameter of more than 5 mm | Drill diameter of 2 to 5 mm | Drill diameter of less than 2 mm |
| Aluminum, brass | 80.0 | 70.0 | 50.0 |
| Free cutting steel, carbon tool steel | 60.0 | 50.0 | 35.0 |
| Free cutting stainless steel, structural carbon steel | 40.0 | 35.0 | 25.0 |
| Alloy tool steel, nickel-chromium steel | 15.0 | 12.0 | 10.0 |
| Hard cutting materials | 10.0 | 9.0 | 8.0 |

TABLE 4

Drill feed rate (coefficient) table

| | Drill diameter of more than 5 mm | | Drill diameter of 2 to 5 mm | | Drill diameter of less than 2 mm | |
|---|---|---|---|---|---|---|
| Type of material | Coeff. 1 | Coeff. 2 | Coeff. 1 | Coeff. 2 | Coeff. 1 | Coeff. 2 |
| Aluminum, brass | 0.0185 | 0.0275 | 0.02 | 0.02 | 0.03 | 0 |
| Free cutting steel, carbon tool steel | 0.0143 | 0.0285 | 0.0167 | 0.0166 | 0.025 | 0 |
| Free cutting stainless steel, structural carbon steel | 0.0114 | 0.023 | 0.0133 | 0.0134 | 0.02 | 0 |
| Alloy tool steel, nickel-chromium steel | 0.0086 | 0.017 | 0.01 | 0.01 | 0.015 | 0 |
| Hard cutting materials | 0.0057 | 0.0115 | 0.067 | 0.066 | 0.01 | 0 |

The cutting conditions determined from the above standard cutting condition tables (cutting speed and feed rate) are the rotational speed of the spindle turning the bar being worked in the NC lathe and the relative feed per revolution during cutting between the bar and tool when the type of the cutting designated by the input unit 12 is turning and the type of the designated tool is a turning tool. Further, when the type of the cutting designated by the input unit 12 is milling or drilling and the type of the designated tool is a rotary tool, they are the rotational speed of the rotary tool and the relative feed per revolution during cutting between the rotary tool and the bar. Among these cutting conditions, the rotational speed of the spindle or rotary tool are found by predetermined calculations based on the cutting speed data registered in the cutting condition data table 24, while the relative feed rate between the tool and bar is either the feed rate data registered in the cutting condition data table 24 as it is or is calculated by predetermined calculation based on the feed rate data.

Therefore, in the illustrated embodiment, a cutting condition calculation expression table 42 setting and registering cutting condition calculation expressions for calculating the cutting conditions from the standard cutting condition data and tool data for each of the types of the plurality of types of cutting processes is stored in advance in the storage unit 18. Further, the cutting condition determination processing unit 20, at the same time as reading the tool data and the standard cutting condition data as explained above, specifies and reads the cutting condition calculation expressions corresponding to the cutting processes designated by the input unit 12 in the cutting condition calculation expression table 42 and automatically determines the cutting conditions in accordance with the read cutting condition calculation expressions.

For example, in OD turning, OD grooving, rough machining, and other turning processes on the outer circumferential surface of a bar, the spindle speed and feed rate are determined as the cutting conditions. Therefore, the cutting condition calculation expression table 42 stores $S=V/(\pi \times d) \times 100$ as the cutting condition calculation expression corresponding to these turning processes. Here, "S" indicates the speed of the main spindle, "V" the cutting speed data (Table 1) registered in the cutting condition data table 24, and "d" the outer diameter of the cut portion of the bar before cutting. Further, the feed rate uses the feed rate data (Table 2) registered in the cutting condition table 24. In this case, the feed rate data used differs in accordance with the in-feed automatically displayed (or if necessary registered for a change) at the data input screen 40A (FIG. 7).

Further, in end drilling, cross drilling, eccentric drilling, and other drilling of the end face or the outer circumferential surface of the bar, the spindle speed (in case of a fixed tool) or the tool speed (in the case of a rotary tool) and feed rate are determined as the cutting conditions. Therefore, the cutting condition calculation expression table 42 stores $S=V/(\pi \times d) \times 100$ as the cutting condition calculation expression corresponding to these drilling. Here, "S" indicate the spindle speed or the tool speed, "V" the cutting speed data registered in the cutting condition data table 24 (Table 3), and "d" the tool diameter (registered for each registered tool name in tool data table 26). In this case, different cutting speed data "V" is used in accordance with the diameter of the designated tool. Further, the cutting condition calculation expression table 42 stores $F=d \times k1+k2$ as another cutting condition calculation expression corresponding to drilling. Here, "F" indicates the feed rate, "d" the tool diameter, and k1 and k2 the coefficient 1 and coefficient 2 of the feed rate data (Table 4) registered in the cutting condition data table 24. Different feed rates (coefficients) are also used in accordance with the diameter of the designated tools.

The above cutting conditions generally differ somewhat according to the differences in materials, dimensions, etc. of the designated tool, so to produce high accuracy machining programs, it is preferable to be able to determine the optimal cutting conditions for the attributes of tools. Therefore, in the illustrated embodiment, a parameter table 44 setting and registering standard parameters for adjusting the standard cutting condition data corresponding to the attributes of the tools (registered for each registered tool name in the tool data table 26) for each attribute of the tools and type of material of the machined bars is stored in advance in the storage unit 18. The standard parameters are ratios (percentages) for adjusting the above standard cutting condition data (cutting speed, feed rate) in accordance with the attributes of the tools and are standard data derived from experience relating to the individual cutting processes in the NC lathe covered. Therefore, by multiplying the standard parameters with the cutting conditions calculated in accordance with the cutting condition calculation expressions, it is possible to determine the optimal cutting conditions for the attributes of tools.

Table 5 is an example of a standard parameter table for adjusting the standard cutting condition data (cutting speed, feed rate) in drilling described in the above Table 3 and Table 4. In this example, ratios (percentages) for adjusting the cutting speed and feed rate for two types of drills with different attributes, that is, the registered names DSC-2.2 and DSC-3.0, are defined for each material of the bar. Therefore, in the illustrated embodiment, the cutting condition determination processing unit 20 specifies and reads the standard parameters required for the cutting processes designated by the input unit 12 from the type of material of the workpiece designated by the input unit 12 and the attributes of the tools in the standard parameter table 44 stored in the storage unit 18 and determines the cutting conditions using the read standard parameters.

TABLE 5

Drill ratio table

| Registered name | Type of material | Cutting speed (%) | Feed rate (%) |
| --- | --- | --- | --- |
| DSC-2.2 | Aluminum, brass | 100.0 | 100.0 |
| | Fast cutting steel, carbon tool steel | 100.0 | 100.0 |
| | Fast cutting stainless steel, structural carbon steel | 95.0 | 90.5 |
| | Alloy tool steel, nickel-chromium steel | 92.3 | 90.0 |
| | Hard cutting materials | 90.5 | 90.0 |
| DSC-3.0 | Aluminum | 98.2 | 100.0 |
| | Fast cutting steel, carbon tool steel | 97.5 | 100.0 |
| | Fast cutting stainless steel, structural carbon steel | 95.0 | 90.5 |
| | Alloy tool steel, nickel-chromium steel | 90.3 | 90.0 |
| | Hard cutting materials | 80.0 | 90.0 |

In this way, when the cutting conditions are determined at step S6, at step S7 the program generation processing unit 22 generates a machining program of the designated cutting process in accordance with the program generation algorithm as explained above. In the illustrated embodiment, the program generation processing unit 22 generates the machining program using the standard machining condition data required by the designated cutting process (stored in standard machining condition data table 38 or changed at data input screen 40 (step S5)) and supplementary data (registered at data input screen 40 (step S5)). Here, as an example of the program generation algorithm registered at the algorithm table 28, a program generation algorithm in OD turning, OD grooving, rough machining, and other turning for the outer circumferential surface of a bar will be explained simply.

Figure 8:
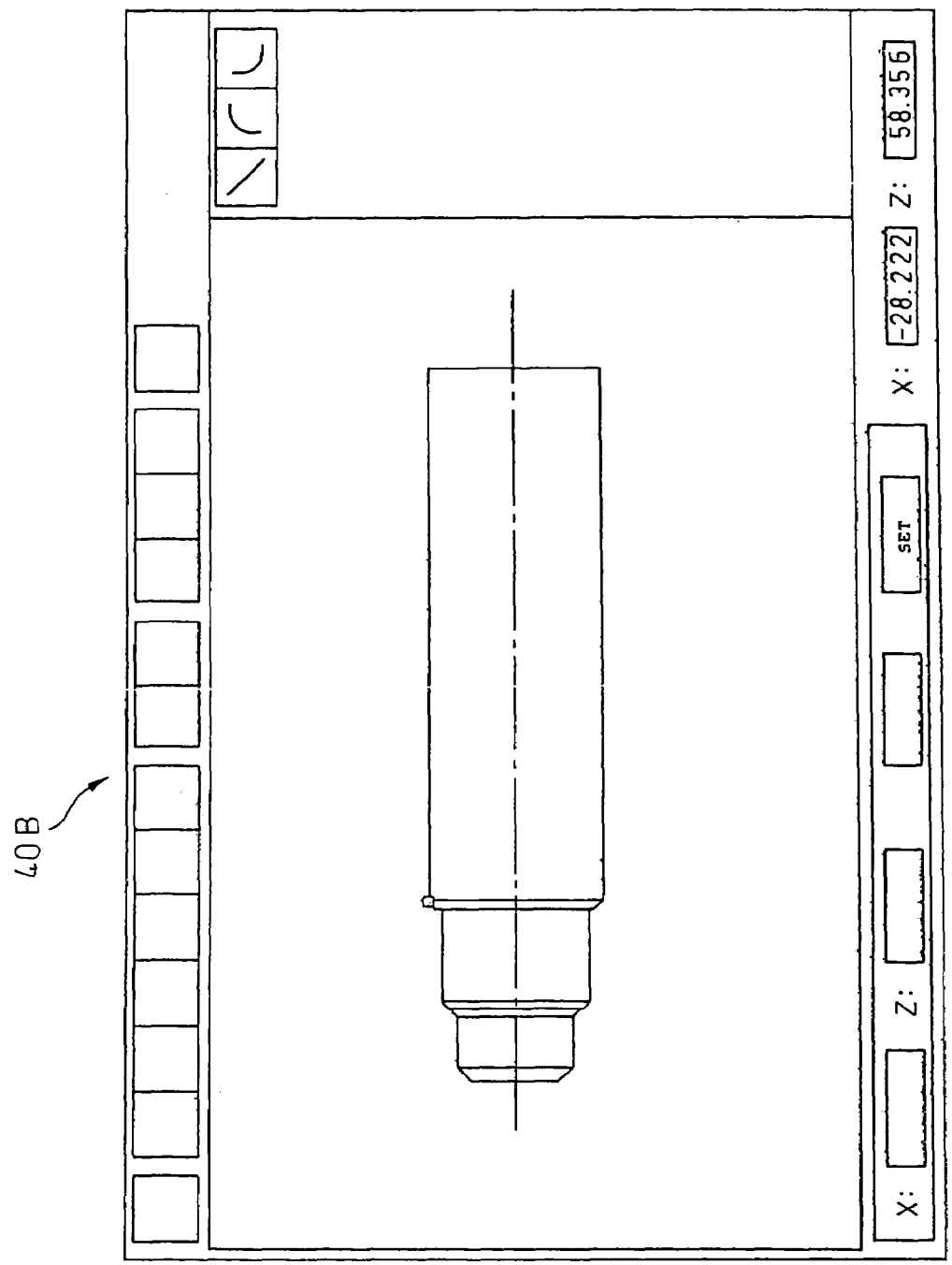
FIG. 8 is a view of another data input screen in the automatic programming apparatus of FIG. 1.
Figure 9:
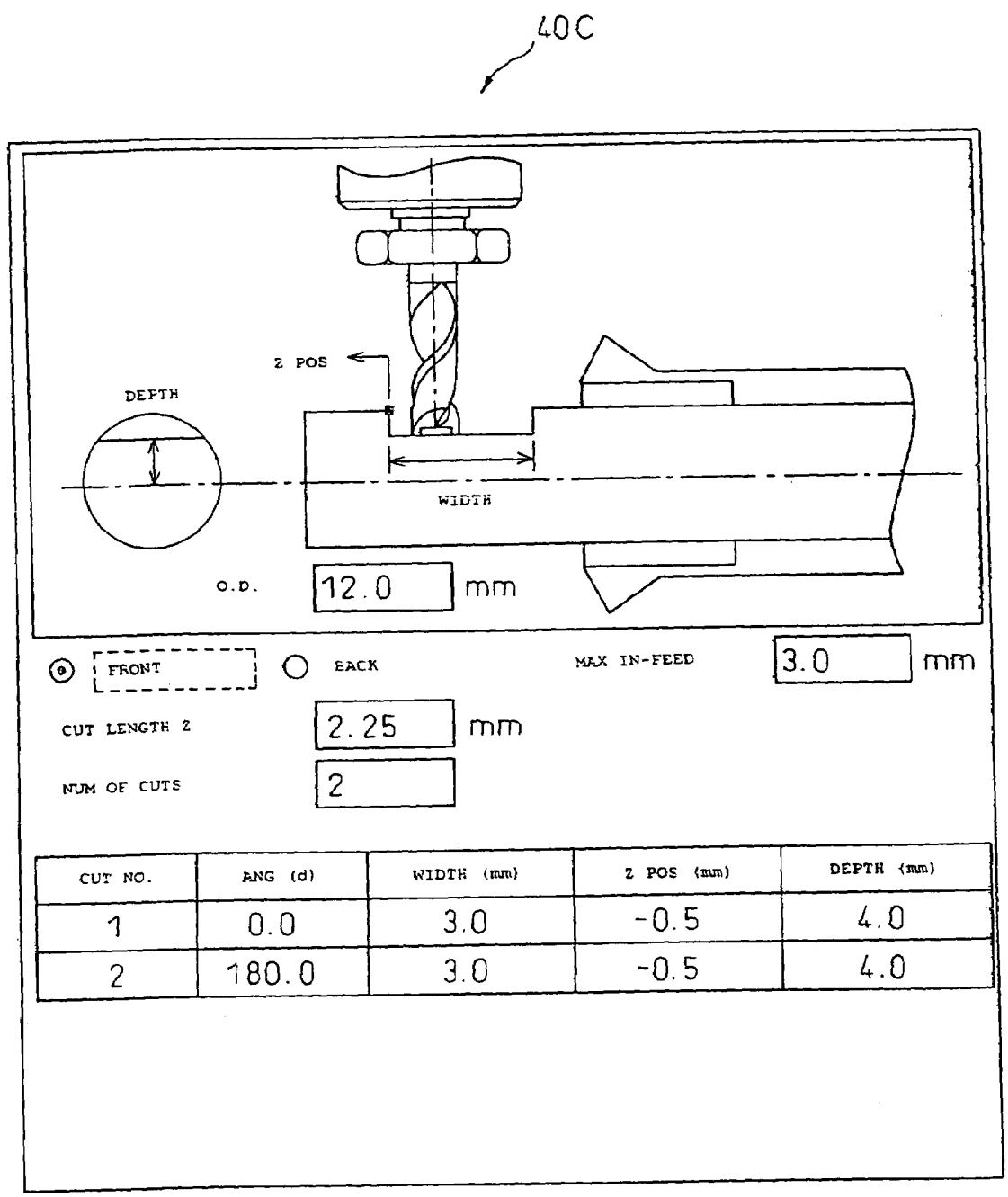
FIG. 9 is a view of still another data input screen in the automatic programming apparatus of FIG. 1.

In turning on the outer circumference of a bar, the standard machining condition data and supplementary data are registered by the data input screens 40A and 40B shown in FIG. 7 and FIG. 8 and the cutting conditions (spindle speed and feed rate) are determined by the above-mentioned routine. Therefore, the program generation processing unit 22 generates a block of commands for making the spindle of the NC lathe rotate in accordance with the cutting conditions in the initial step of a program generation algorithm. At the next step, it generates a block of commands for positioning the nose at the position of (X,Y)=(bar diameter+1 mm, Z-coordinate of machining start point). At the next step, it generates a block of commands for positioning the nose at the machining start point. At the next step, it generates a block of commands for making the nose move for cutting along the shape drawn by the drawing input screen 40B. Further, at the final step, it generates a block of commands for positioning the nose at a machining end point after cutting to the end point of the drawing. In this way, a machining program for an outer circumferential turning is automatically produced. Note that in this program generation algorithm, the machining start point is determined by several methods defined in accordance with the presence of any face cutting margin or the position of the end point of the drawing. Similarly, the machining end point is determined by several methods defined in accordance with the position of the end point of the drawing.

The machining program produced at step S7 is described on the program screen 46 (FIG. 1) stored in advance in the storage unit 18 and displayed on the display of the display unit 14. The program screen 46 has the screen configuration shown in FIG. 10 and preferably is displayed on the display of the display unit 14 in parallel with the process list screen 36 and the data input screen 40. In the illustrated example, "face drilling" is designated at the processing list screen 36, and a data input screen 40 corresponding to the face drilling and a program screen 46 describing the drilling program are displayed. The operator can refer to the program screen 46 displayed on the display unit 14 and judge the appropriateness of the produced machining program.

Here, the machining program produced at step S7 can be adopted immediately as it is and sent to the NC device, but in practice it is advantageous for the operator for example to compare it with its experience and judge the appropriateness while referring to the program screen 46 and then if necessary correct the machining program. From this viewpoint, in the illustrated embodiment, it is possible to configure the system so that the input unit 12 can accept changes in the cutting conditions determined at step S6 if necessary and so that the program generation processing unit 22 can correct the machining program produced at step S7 in accordance with the changes in the cutting conditions accepted at the input unit 12. Further, the storage unit 18 stores the condition changing screen 48 (FIG. 1) for changing the cutting conditions in advance.

Therefore, when the operator judges the correction of the machining program is necessary by referring to the program screen 46, at step S8, it operates the input unit 12 to make the display of the display unit 14 display the condition changing screen 48 and changes the cutting conditions determined for the designated material and the designated tool on the condition changing screen 48 to the desired content. The condition changing screen 48 has the screen configuration illustrated in FIG. 11. In the illustrated example, the standard cutting conditions (spindle speed, feed rate, chamfering) determined by the machining condition of an in-feed of at least 4 mm when performing OD turning by an OD cutting tool on a bar of aluminum or brass (outer diameter: 12 mm) are displayed. The operator can change any item of the cutting conditions on the condition changing screen 48 to any values through the input unit 12. Further, the program generation processing unit 22 generates a corrected machining program based on the changed cutting conditions.

It is expected that such correction of a machining program automatically produced by the automatic programming apparatus 10 would generally be performed by an operator having a high level of knowledge or experience. Therefore, when an operator having little knowledge or experience next tries to produce a similar machining program by the automatic programming apparatus 10, it would be advantageous if it could easily (preferably without being aware of it) re-use the values of the cutting conditions changed by the previous operator. From this viewpoint, in the illustrated embodiment, the control unit 16 is configured to judge at step S9 if the cutting conditions were changed at step S8 and, only when not changed, end the flow of automatic production of the program. Further, when the cutting conditions were changed, at step S10, the control unit 16 makes the cutting condition determination processing unit 20 calculate changing parameters so as to enable it to determine the changed cutting conditions changed by the operator at step 58 for correcting the machining program from the standard cutting condition data registered in the cutting condition data table 24 and stores the changing parameters in the storage unit 18 for each attribute of the tools and for each type of material of the workpiece.

The changing parameters are ratios (percentages) for adjusting the standard cutting condition data (cutting speed, feed rate) in accordance with the attributes of the tools in the same way as the standard parameters registered in the standard parameter table 44 in the storage unit 18. Therefore, the calculated changing parameters are preferably rewritably registered in the standard parameter table 44 while storing the preregistered standard parameters. Further, each time the automatic programming apparatus 10 automatically produces a machining program, the cutting condition determination processing unit 20 judges if changing parameters able to be specified from the attributes of the tools and the type of material of the workpiece designated by the operator are registered in the standard parameter table 44 under the control of the control unit 16. When registered, it determines the cutting conditions using the changing parameters instead of the standard parameters able to be specified by the same attributes of tools and type of material of the workpiece. By this configuration, when another operator next produces a similar machining program, it is able to reuse the changed cutting conditions, that is, the values of the cutting conditions changed by the previous operator at the time of automatically producing a machining program, without being aware of this at all. Such changing parameters enable greater improvement in accordance with the knowledge and experience of the operator by enabling constant rewriting.

Further, it is also possible to configure the system so that, when determining the cutting conditions, if changing parameters able to be specified by the attributes of the tools and type of material of the workpiece the same as the required standard parameters are registered in the standard parameter table 44, the operator is able to suitably select either of the cutting conditions determined using the standard parameters or the cutting conditions determined using the changing parameters through the input unit 12. By doing this, another operator can initiate automatic programming after judging the appropriateness of the cutting conditions changed by the previous operator. Further, it is also possible to design the system so that, in the above flow, when desiring to correct a machining program automatically produced by the program generation processing unit 22, correction items can be directly input to the data input screen 40 and program screen 46 shown in FIG. 10. In this case, if differentiating registration of changes of cutting conditions using the condition changing screen 48 and preventing calculation and registration of changing parameters in the flow, it becomes possible to deliberately conceal the knowhow of individual operators.

As explained above, according to the automatic programming apparatus 10, at the stage of reading the processes required for machining from the design drawings of the machined product, the operator can successively designate required processes and also designate the tools and register the required data after designation of the processes, so can perform the work of input smoothly without any interruption in its train of thought. Further, since the standard machining conditions required for cutting processes are registered in advance, the amount of data to be registered can be kept small. Further, since the standard cutting conditions can be automatically determined in accordance with the material of the workpiece and the attributes of the tools, there is the advantage that even an operator with poor programming skill or knowledge of the machining processes can initiate automatic programming relatively easily in a short time. Further, since the automatically produced machining program can be suitably corrected in accordance with the experience of an operator and the corrected content stored and used by other operators, the advanced programming skill based on its high level of knowledge and experience can be shared by a large number of operators. Therefore, according to the automatic programming apparatus 10, it is possible to quickly and accurately automatically produce a series of machining programs for automatically machining complicated and diverse shapes of products without being affected by the level of knowledge or experience of the operator.

As clear from the above explanation, according to the present invention, there are provided an automatic programming apparatus and automatic programming method for automatically producing machining programs to be executed by an NC machine tool which enable a series of machining programs for automatically machining complicated and diverse shapes of products by a multiple function machining type NC machine tool quickly and accurately without being affected by the level of knowledge or experience of the operator.

Figure 12:
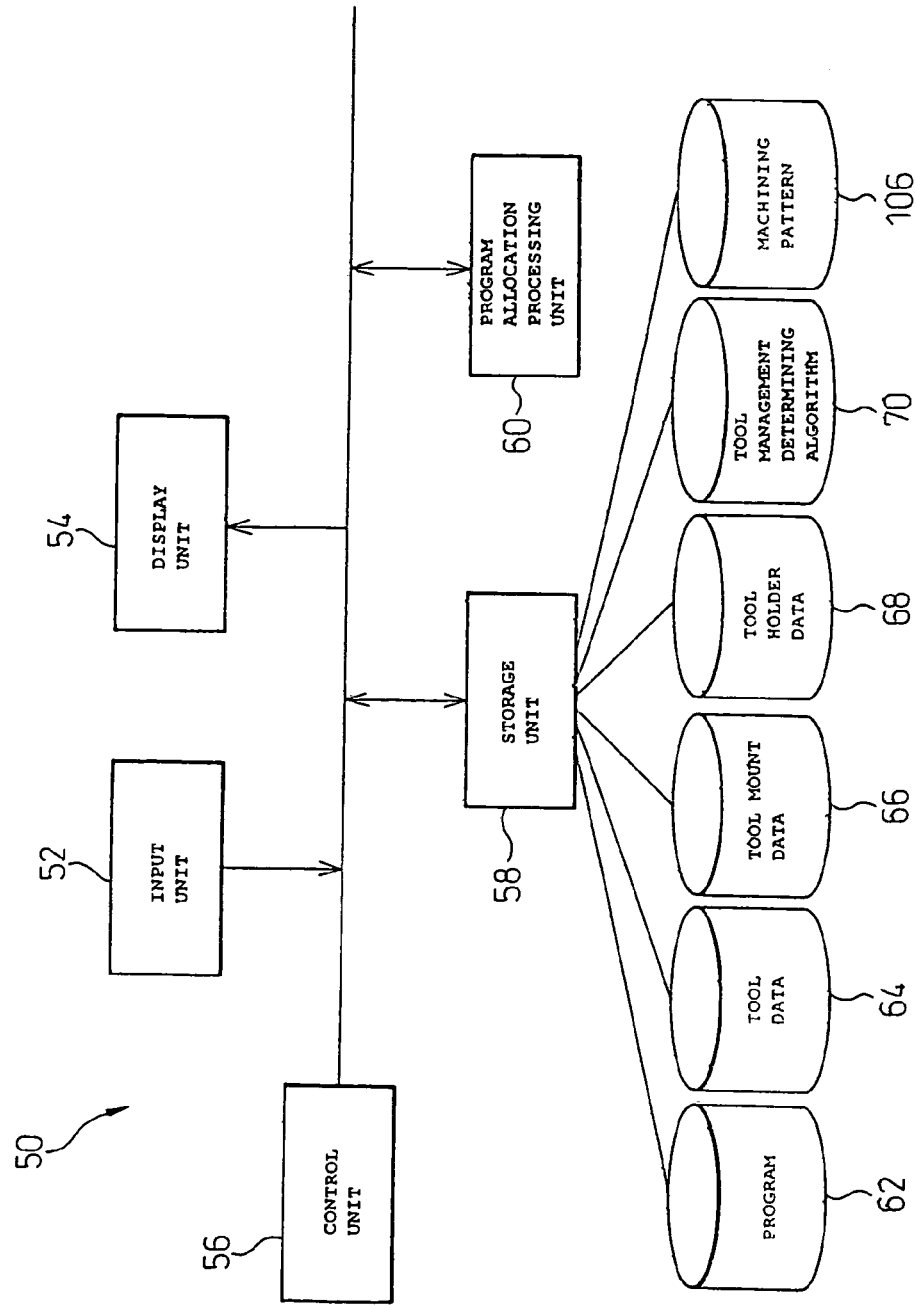
FIG. 12 is a block diagram of an automatic programming apparatus according to a second embodiment of the present invention.

FIG. 12 is a block diagram of an automatic programming apparatus 50 according to a second embodiment of the present invention. The automatic programming apparatus 50 executes the automatic programming method according to the present invention and automatically produces a multi-line control program to be executed by a not shown NC machine tool having at least one spindle able to be driven under the control of a plurality of lines and at least one tool rest. The NC device (not shown) mounted in the NC machine tool controls the operation of the NC machine tool in accordance with the multi-line control program received from the automatic programming apparatus 50.

As shown in FIG. 12, the automatic programming apparatus 50 is provided with an input unit 52, display unit 54, control unit 56, storage unit 58, and program allocation processing unit 60. Explained generally, the input unit 52 has a not shown keyboard with numeric keys or a mouse or other pointing device and is designed to allow the operator to issue instructions by a dialog format or input data while referring to various screens explained later displayed on the display unit 54. The display unit 54 has a not shown CRT, LCD, or other display, selectively displays various screens relating to various data explained later stored in the storage unit 58 to enable input by the operator by a dialog format, and displays the multi-line control program automatically produced in accordance with a later explained routine.

The control unit 56 has for example a not shown computer CPU and controls all sorts of operations relating to the automatic production of the multi-line control program in the automatic programming apparatus 50 such as making the storage unit 58 store various types of instructions or data input by the input unit 52, making the display unit 54 suitably display various types of screens explained above, and making the program allocation processing unit 60 execute various processing explained later. The storage unit 58 for example has a not shown computer ROM or RAM or floppy disk or other external storage medium, stores in advance the various data, screens, etc. explained later relating to automatic production of a multi-line control program, and stores data input by the input unit 52 and the automatically produced multi-line control program. The program allocation processing unit 60 can be configured by for example a not shown computer CPU, transfer data and instructions with the input unit 52, display unit 54, and storage unit 58, and generate the desired multi-line control program.

Explained in more detail, the storage unit 58 stores in advance a plurality of programs 62 individually produced without consideration of allocation to the plurality of lines for control of the plurality of processes required for producing a machined product by an NC machine tool, tool data 64 relating to the attributes of a plurality of types of tools able to be used in a plurality of types of cutting processes able to be executed by the NC machine tool, tool mount data 66 relating to the positions of a plurality of tool mounts on a tool rest provided on at least one tool rest of the NC machine tool, tool holder data 68 relating to the attributes of a plurality of types of tool holders able to be attached on the plurality of tool mounts, and tool management determining algorithms 70 for allocating attachment locations of the plurality of designated tools designated by programs 62 to the plurality of tool mounts assuming several of the plurality of programs 62 will be executed in parallel by a least two lines of the plurality of lines.

Further, under the control of the control unit 56, the program allocation processing unit 60 performs processing in accordance with a tool management determining algorithm 70 stored in the storage unit 58 so as to specify as the attachment locations of the plurality of designated tools a plurality of tool mounts able to execute the programs 62 relating to the designated tools out of the plurality of tool mounts based on the tool data 64 and tool mount data 66 stored in the storage unit 58, select the plurality of tool holders to be used for attaching the corresponding plurality of designated tools of the specified plurality of tool mounts based on the tool data 64 and the tool holder data 68 stored in the storage unit 58, describe the commands for designating the specified plurality of tool mounts in the plurality of programs 62 stored in the storage unit 58 after completion of selection of the plurality of tool holders, and automatically allocate the programs 62 to the plurality of lines.

Explaining the configuration of the above automatic programming apparatus 50 in more detail, first, the configuration of a multi-spindle, multi-line control type NC lathe will be generally explained with reference to FIG. 13 as an example of an NC machine tool able to use the automatic programming apparatus 50.

This NC lathe is provided with a main (or front) first spindle 72 securely holding and rotating a bar supplied from outside the lathe, a supplementary (or back) second spindle 74 able to be arranged facing the first spindle 72 coaxially in the axial line direction and securely holding and rotating a partially machined bar transferred from the first spindle 72, first and second tool rests 80 and 82 carrying pluralities of tools 76 and 78 and operating independently, and a third tool rest 84 carrying a plurality of tools 78 and arranged in a fixed manner. In this NC lathe, the first spindle 72, second spindle 74, first tool rest 80, and second tool rest 82 operate under the control of three lines explained later. Due to this, various types of automatic machining including simultaneous machining are executed.

The first spindle 72 is configured to move linearly along a feed control axis (Z1 axis) parallel to its own axis of rotation 72a. At a predetermined position in front of the first spindle 72 in the axial direction, a guide bush 86 is placed coaxially with respect to the first spindle 72 as a supplementary support device supporting the bar securely held at the first spindle 72 near the length to be machined of its front end.

The first tool rest 80 is arranged near the side of the guide bush 86 in front of the first spindle 72 in the axial direction and is configured to move linearly along a feed control axis (X1 axis) perpendicularly intersecting an X1 axis of the first spindle 72 and a feed control axis (Y1 axis) perpendicularly intersecting the Z1 axis and X1 axis. The first tool rest 80 is a so-called gang tool rest (or flat turret) provided with a plurality of tool mounts 88 for arranging and holding in parallel the plurality of tools 76 and 78 and can carry turning tools, drills and other turning tools as well as mills and other rotary tools in arrangements able to be positioned perpendicular to the axis of rotation 72a of the first spindle 72. The first tool rest 80 basically can make the noses of the desired tools 76 and 78 allocated and selected by its own Y1 axial movement controlled by the first line operate complementarily in accordance with an NC program by co-action between the X1 axial movement of the first tool rest 80 itself and Z1 axial movement of the first spindle 72 controlled by the same first line and thereby perform the desired cutting process on the bar securely held by the first spindle 72. Note that the Y1 axial movement of the first tool rest 80 functions not only as tool selection movement, but also cutting (D-cut) movement of the outer circumference of the bar when for example selecting a rotary tool. Further, a predetermined tool mount 88 of the first tool rest 80 can carry drilling tools or rotary tools using a plurality of types of not shown tool holders.

The second tool rest 82 is arranged at the substantially opposite side to the first tool rest 80 across the guide bush 86 and is configured to move linearly along the feed control axis (X2 axis) perpendicular to the Z1 axis of the first spindle 72 and the feed control axis (Z2 axis) parallel to the Z1 axis. The second tool rest 82 is a so-called turret tool rest provided with a plurality of tool mounts 90 for holding a plurality of tools 76 in an arrangement at equal intervals in the circumferential direction. It has a rotation indexing control axis (T1 axis) parallel to the Z2 axis and can carry turning tools, drills and other turning tools as well as mills and other rotary tools in an arrangement able to be positioned to be perpendicular or parallel to the axis of rotation 72a of the first spindle 72. The second tool rest 82 basically can make the noses of the desired tools 76 and 78 allocated and selected by its own T1 axial rotation controlled by the second line operate complementarily in accordance with an NC program by co-action between the X2 axial movement and Z2 axial movement of the second tool rest 82 itself controlled by the same second line and thereby perform the desired cutting process on the bar securely held by the first spindle 72.

The tool mounts 90 of the second tool rest 82 can carry various types of tools 76 and 78 using a plurality of types of tool holders 92. At this time, depending on the configuration of the tool holder 92, it is possible to attach a pair of tools on one tool mount 90 oriented to enable simultaneous machining of both a bar securely held by the first spindle 72 and a bar securely held by the second spindle 74.

The second spindle 74 has an axis of rotation 74a parallel with the axis of rotation 72a of the first spindle 72, is arranged in front of the first spindle 72 in the axial direction to be able to face it across a guide bush 86, and is configured to move linearly along a feed control axis (X3 axis) perpendicular to the Z1 axis of the first spindle 72 and a feed control axis (Z3 axis) parallel to the Z1 axis. As opposed to this, the third tool rest 84 has the configuration of a gang tool rest provided with a plurality of tool mounts 94 for holding a plurality of tools 78 in a parallel arrangement, carries drills and other turning tools or end mills and other rotary tools in an arrangement able to be positioned parallel to the axis of rotation 74a of the second spindle 74, and is arranged facing the X3 axis movement path of the second spindle 74. Note that the third tool rest 84 can be called for example a "Back 3" type from its configuration. The second spindle 74 basically selects the desired tool 78 on the third tool rest 84 by its own X3 axial movement controlled by the third line, can make the nose of the tool 78 operate relatively complementarily in accordance with the NC program, and thereby perform the desired cutting process on the bar transferred from the first spindle 72 to the second spindle 74. Note that the tool mounts 94 of the third tool rest 84 can carry drilling tools or rotary tools using a plurality of types of not shown tool holders.

Further, the first spindle 72 and the second spindle 74 can be provided with rotational angle control axes (C1 axis and C2 axis). Therefore, the first and second spindles 72 and 74 perform various types of machining using the rotary tools carried at the desired tool rests 80, 82, and 84 at desired positions on the end face or outer circumferential surface of the bars held there by positioning and indexing operations of the C1 axis and C2 axis.

In this way, the above-mentioned NC lathe can control the operations of the spindles 72 and 74 and the tool rests 80, 82, and 84 along the large number of control axes in accordance with a three-line control program so as to simultaneously use as many as three tools 76 and 78 selected on the three tool rests 80, 82, and 84 and automatically machine bars securely held by the two spindles 72 and 74.

Next, a specific example of the automatic programming apparatus 50 and the automatic programming method executed there will be explained in relation to the above NC lathe while referring to the flow charts shown in FIG. 14A and FIG. 14B, the example of machining a product shown in FIG. 15, and the various types of display screens shown in FIG. 16 to FIG. 22.

Figure 14A:
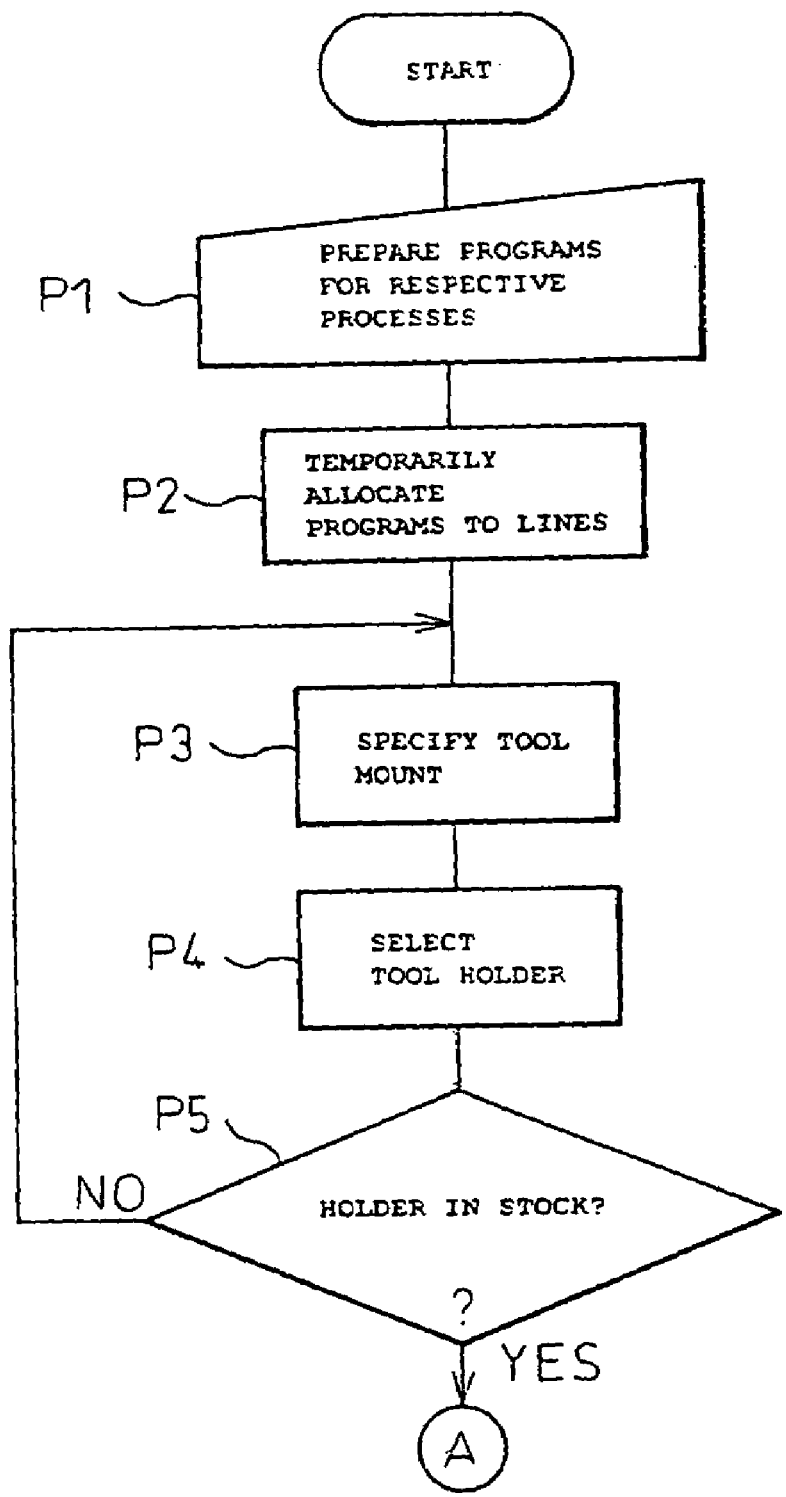
FIG. 14A and FIG. 14B are flow charts of an automatic programming method to be executed by the automatic programming apparatus of FIG. 12.
Figure 14B:
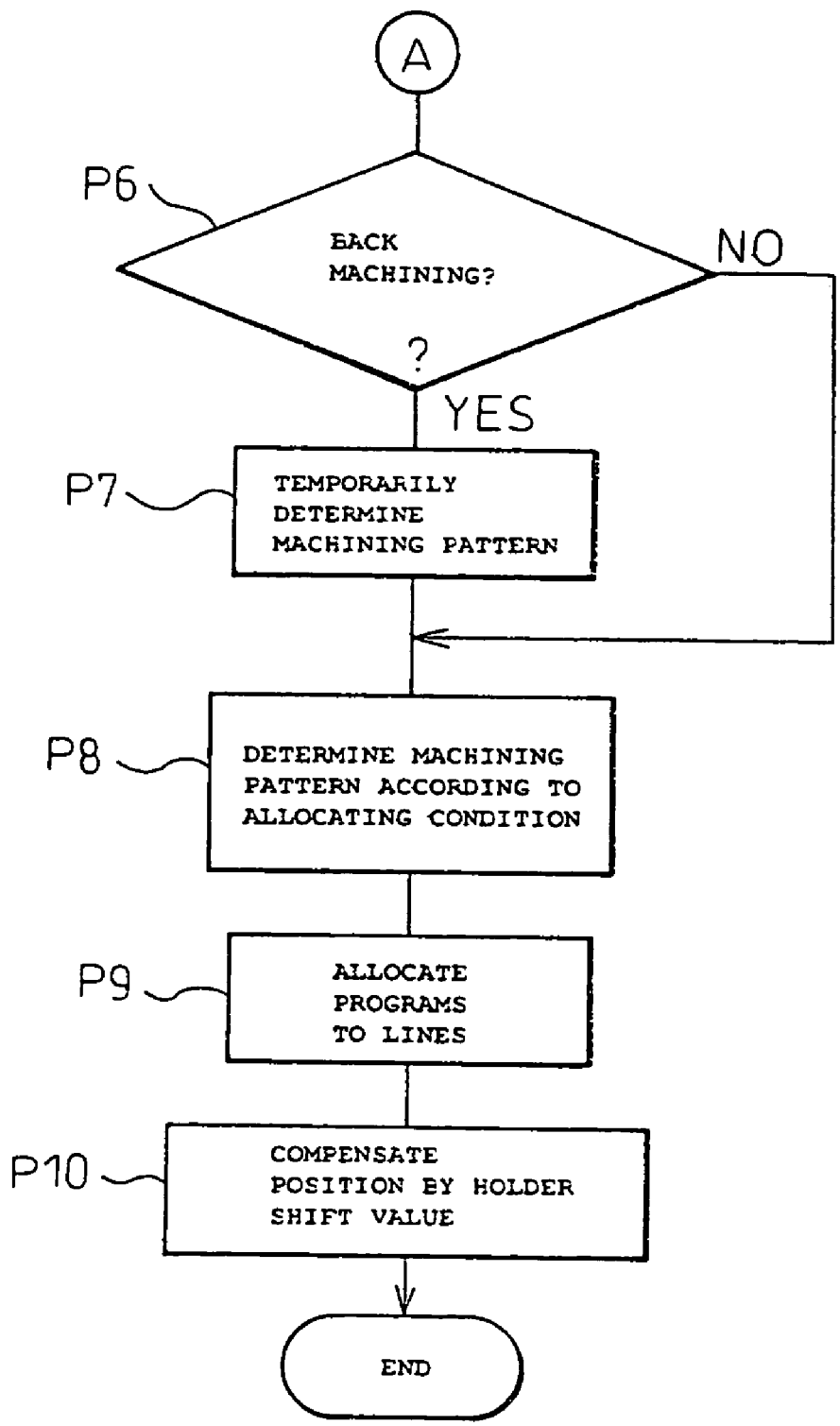

First, at step P1 of the flow charts of FIG. 14A and FIG. 14B, the operator reads the plurality of processes required for producing a machined product on an NC lathe from the design drawings of the machined product and produces a plurality of programs 62 for controlling these processes separately without considering allocation to the three lines of the NC lathe (that is, without designating the locations of attachment of the tools designed by the programs). In the machining example of FIG. 15, (1) OD turning process, (2) OD thread cutting, (3) D-cutting, (4) cross centering, (5) cross drilling (the above processes being performed by securely holding the bar by the front first spindle 72), (6) cut-off/pick-off (transfer of bar from first spindle 72 to second spindle 74), (B-1) face centering, (B-2) face drilling, (B-3) face tapping, (B-4) OD turning (the above processes being performed while securing holding the bar at the back second spindle 74), i.e., a total of 10 cutting processes (tool path shown schematically by arrows) are read from the design drawings.

Further, the operator can deliberately describe commands for designating the attachment locations of the desired tools as tool mounts 88, 90, and 94 preset on any one of the tool rests 80, 82, and 84 and produce the programs 62. In this case, it is possible to configure the system so as to hold with priority the preset data of the tool management set at the user side in the following flow of automatic production of the multi-line control program and automatically allocate attachment locations to the remaining tool mounts for only tools not having preset data. Further, before starting the automatic production of the multi-line control program, it is advantageous if the operator can designate whether to hold such tool management preset data with priority. This will be explained further later with reference to the item "selection of allocation conditions".

The programs 62 of the processes read from the design drawings may be produced manually by the operator or produced using another known automatic programming apparatus. Alternatively, it is possible to add an automatic production function of programs for each process. For example, it is possible to add the configuration of the automatic programming apparatus 10 explained above to the automatic programming apparatus 50. In this case, the two input units 12 and 52, display units 14 and 54, control units 16 and 56, and storage units 18 and 58 can be combined.

The 10 types of programs 62 produced at step P1 are stored in advance in the storage unit 58 added with the preparations at the start of the machining order and added with the back spindle separation at the end according to the machining order (i.e., order explained above). Note that the T-code given to each process in FIG. 15 is the tool number showing the attachment location of each designated tool described in the multi-line control program produced by the automatic programming apparatus 50.

Figure 16:
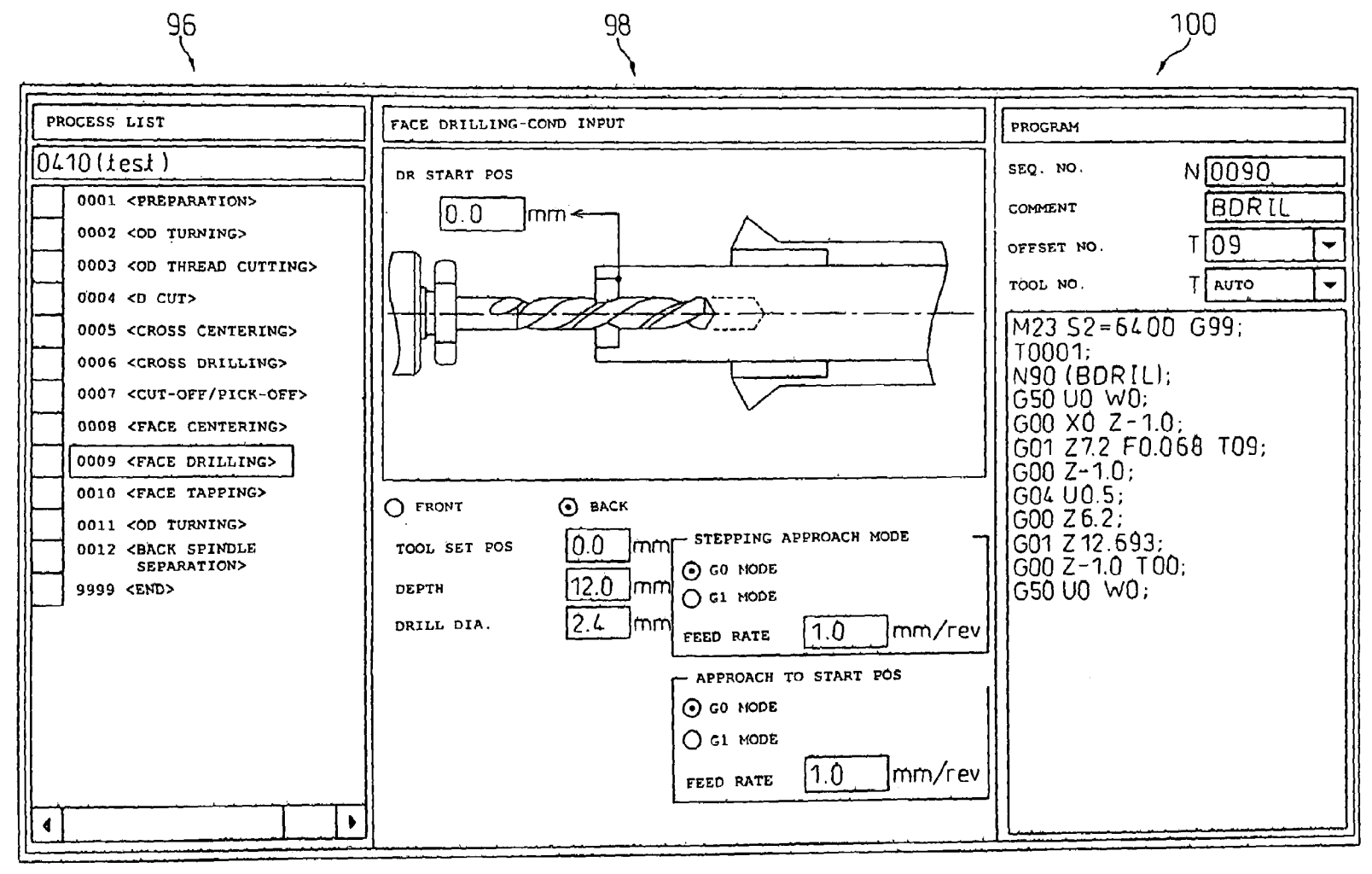

The storage unit 58 stores in advance a process list screen 96 (see FIG. 16) listing all of the processes required for machining a single product. The programs 62 for the processes stored in the storage unit 58 are listed on the process list screen 96 and displayed in a list on the display of the display unit 54 at any time under the control of the control unit 56. As shown in FIG. 16, the display of the display unit 54 can display, in parallel with the process list screen 96, a data input screen 98 enabling input of various data relating to a process designated on the process list screen 96 (in the figure, face drilling) and a program screen 100 describing the program of that process (in the figure, a face drilling program). Note that in the program described on the illustrated program screen 100, the tool number is not yet designated.

Next, at step P2, the control unit 56 first temporarily allocates the plurality of programs 62 stored in the storage unit 58 to the three lines of the NC lathe. This temporary allocation work is for enabling smooth execution of the program allocation routine in the following steps. While not essential, it is advantageous to for example set a suitable temporary allocation routine in the tool management determining algorithms 70. Here, in the mechanical configuration of the NC lathe shown in FIG. 13, it is suitable to define the cutting processes by the tools 76 and 78 on the first tool rest 80 in the line 1 as main processes and to define the cutting processes by the tools 76 and 78 on the second and third tool rests 82 and 84 in the other lines 2 and 3 as supplementary processes. A brief explanation will be given of the temporary allocation routine in the illustrated embodiment set from such a viewpoint.

First, the program of the process to be executed first (i.e., preparations) is arranged at the first position of the program description region $1 in the storage unit 58 corresponding to the line 1, then the programs of the series of front machining processes (1) to (5) on the bar securely held by the first spindle 72 are arranged in the order of machining. After that, the portion (or series of blocks) for operation of the first spindle 72 in the program for the cut-off/pick-off (6) is arranged. The program description region $2 in the storage unit 58 corresponding to the line 2 has arranged in it the programs of the series of back machining processes (B-1) to (B-4) for the bar securely held by the second spindle 74 in the order of machining and then has arranged after that the program of back spindle separation. The program description region $3 in the storage unit 58 corresponding to the line 3 has arranged in it the portion (or series of blocks) for operating the second spindle 74 in the programs of the cut-off/pick-off (6). Further, at the ends of the series of blocks in the program description regions $1, $2, and $3, programs of end processes are arranged. This completes the temporary allocation. At the stage of temporary allocation, no program for a cutting process is allocated to the program description region $3.

When the programs finish being temporarily allocated, as explained above, the program allocation processing unit 60 selects and specifies the attachment locations of the designated tools 76 and 78 in the plurality of temporarily allocated programs from the plurality of tool mounts 88, 90, and 94 on the three tool rests 80, 82, and 84 under the control of the control unit 56 (step P3). Here, the tool management determining algorithm 70 in the illustrated embodiment will be explained in brief. First, the attachment locations of the designated tools 76 and 78 are alternately selected from the first tool rest 80 and the second tool rest 82 in accordance with the order of arrangement of the programs for the plurality of programs described in the program description regions $1 and $2. In this case, to specify the tool attachment locations forming the criteria for the selection, the attachment location of the cut-off tool in the plurality of designated tools 76 and 78 is designated in advance for the tool mounts 88 and 90 of the first and second tool rests 80 and 82. The reason for making the cut-off tool the standard tool in this way is that all of the positional coordinate data is produced based on the position of the face of the bar formed by the cut-off tool cutting the bar. Note that the attachment location of the cut-off tool can be designated as basic data (in the figure, "cut-off turning tool number") at the same time as designation of the material using the material designating screen 102 for designating the material of the workpiece. The material designating screen 102 can be used when automatically producing the programs for the individual processes and can be stored in advance in the storage unit 58.

Figure 15:
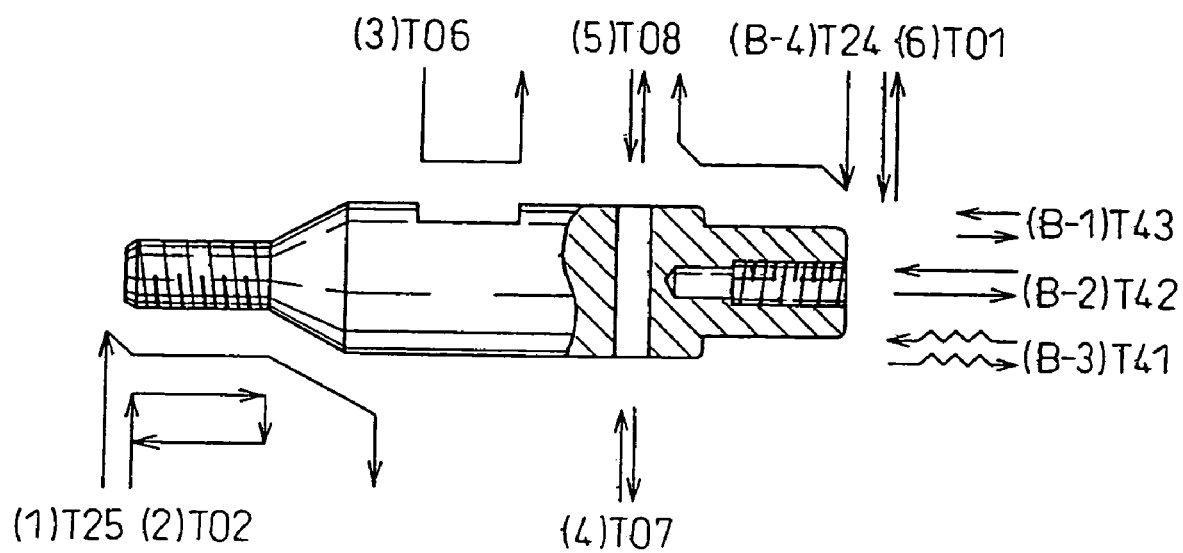
FIG. 15 is a view of an example of machining by a multi-line control program prepared by the automatic programming apparatus of FIG. 12.

Therefore, when the predesignated attachment location of the cut-off tool is the tool mount 88 on the first tool rest 80 (an identify number of for example the T10 level being given by the tool mount data 66), the program allocation processing unit 60 selects and specifies the attachment location of the designated tool in the next process after the preparations (in the machining example of FIG. 15, the (1) OD turning) from the tool mounts 90 on the second tool rest 82 (similarly for example given an identify number of the T20 level), then the T10 level and T20 level are successively alternately specified for the succeeding-processes. Conversely, when the attachment location of the cut-off tool is the T20 level, the attachment location of the designated tool in the next process after the preparations is specified from the T10 level, and the T20 level and T10 level are alternately successively specified for the succeeding processes. In this way, all attachment locations of the designated tools 76 and 78 are allocated to the tool mounts 88 and 90 on the first and second tool rests 80 and 82.

Simultaneously, the program allocation processing unit 60, as explained above, selects the plurality of tool holders (for example, tool holders 92) used for attaching the designated tools 76, 78 on the corresponding tool mounts 88 and 90 based on the tool holder data 68 (step P4). Here, the tool holder data 68 registers a plurality of types of tool holders by their names and registers as attributes of the tool holders the types of tool rests for mounting, the positions of the tool mounts able to be mounted on, the types of processes covered in use, the attributes of the tools covered in use, the amounts of tool nose deviation (so-called shift value), etc. Therefore, the program allocation processing unit 60 can select tool holders while referring to the attributes of the designated tools 76 and 78 registered in the tool data 64 and the positions of the tool mounts 88 and 90 registered in the tool mount data 66. Note that of course use of a tool holder may not be required depending on the attributes of the designated tool and the position of the tool mount.

Note that in the illustrated embodiment, when as explained above the operator registers preset data on the attachment location for a desired designated tool in the program, the program allocation processing unit 60 specifies the attachment location of the designated tool in accordance with the preset data upon instruction of the operator and suitably allocates attachment locations of the other designated tools with no preset data to the remaining tool mounts 88, 90, and 94. Further, the program allocation processing unit 60 selects tool holders able to be carried on the specified tool mounts on a priority basis from the tool holder data 68 for designated tools for which attachment locations are specified in accordance with preset data.

In general, when selecting a tool holder, it is necessary to confirm the stock of the tool holder to be selected. Therefore, in the illustrated embodiment, the stocks of the various tool holders able to be mounted at the tool rests 80, 82, and 84 of the NC lathe are registered in advance in the tool holder data 68 for different attributes of the tool holders. The stocks of the tool holders can be registered using the holder stock screen 104 such as shown in FIG. 18. The holder stock screen 104 can be stored in advance in the storage unit 58. The operator can operate the input unit 52 to display it on the display of the display unit 54.

The program allocation processing unit 60 selects the plurality of tool holders at step P4, then confirms the stocks of the tool holders by reading the information from the tool holder data 68 (step P5). When judging that all of the selected tool holders are in stock, it completes the holder selection and proceeds to the next step. When there are some selected tool holders not in stock, the routine returns to steps P3 and P4 where the tool mounts 88 and 90 are re-specified and the tool holders re-selected for all designated tools so as enable the designated tools for which tool holders not in stock were selected to be attached at other attachment locations using other tool holders in stock. When tool holders not in stock occur even when trying all possible combinations of designated tools, tool mounts, and tool holders in this way, the unit judges that there was an error and stops the flow of programming.

When specifying the tool mounts 88 and 90 and selecting the tool holders for all designated tools in this way, it is essential not only to judge whether to give priority to preset data of the tool management for part or all of the designated tools, but also to determine after sufficient study the tool management or machining accuracy for shortening as much as possible the cycle time of the multi-line control program from the viewpoint of allocating the individual processes to the lines in the most advantageous form for the work efficiency and thereby enabling all of the three lines of the NC lathe to be efficiently used. Therefore, in the illustrated embodiment, one allocation condition selected from the three allocation conditions of (a) giving priority to preset data of tool management, (b) shortening the cycle time of the multi-line control program, and (c) improving the machining accuracy is added to the above-mentioned tool management determining algorithm 70, and a plurality of programs are allocated to the three lines of the NC lathe under the selected allocation condition.

In this case, the operator can operate the input unit 52 to input a command for selecting any one allocation condition from the above three allocation conditions at the initial stage of the flow of programming in the automatic programming apparatus 50. Due to this, the control unit 56 adds the allocation condition designated by the input unit 52 to the tool management determining algorithm 70 stored in the storage unit 58, and the program allocation processing unit 60 specifies the tool mounts 88 and 90 and selects the tool holders in the above way under the designated allocation condition.

Explaining this in brief, when designating (a) "giving priority to preset data of tool management" as the allocation condition, as explained above, the preset data registered by the operator is given priority to in the specification of the tool mounts and the selection of the tool holders. Further, when designating (b) "shortening the cycle time of the multi-line control program" as the allocation condition, the tool mounts are specified and the tool holders selected for all machining processes giving the top priority to shortening the cycle time (or total time from start to finish of one multi-line parallel control) regardless of any preset data by the operator. Further, when designating (c) "improving the machining accuracy" as the allocation condition, the tool mounts and tool holders of the tools and the spindles used in the machining processes for which a predetermined accuracy is required (stored in advance in the storage unit 58) are specified with priority by combinations of the tool rests and spindles enabling high accuracy machining (stored in advance in the storage unit 58), then the tool mounts are specified and the tool holders selected for the remaining machining processes. In this way, it becomes possible in the end to efficiently allocate the plurality of programs to the three lines of the NC lathe.

Figure 13:
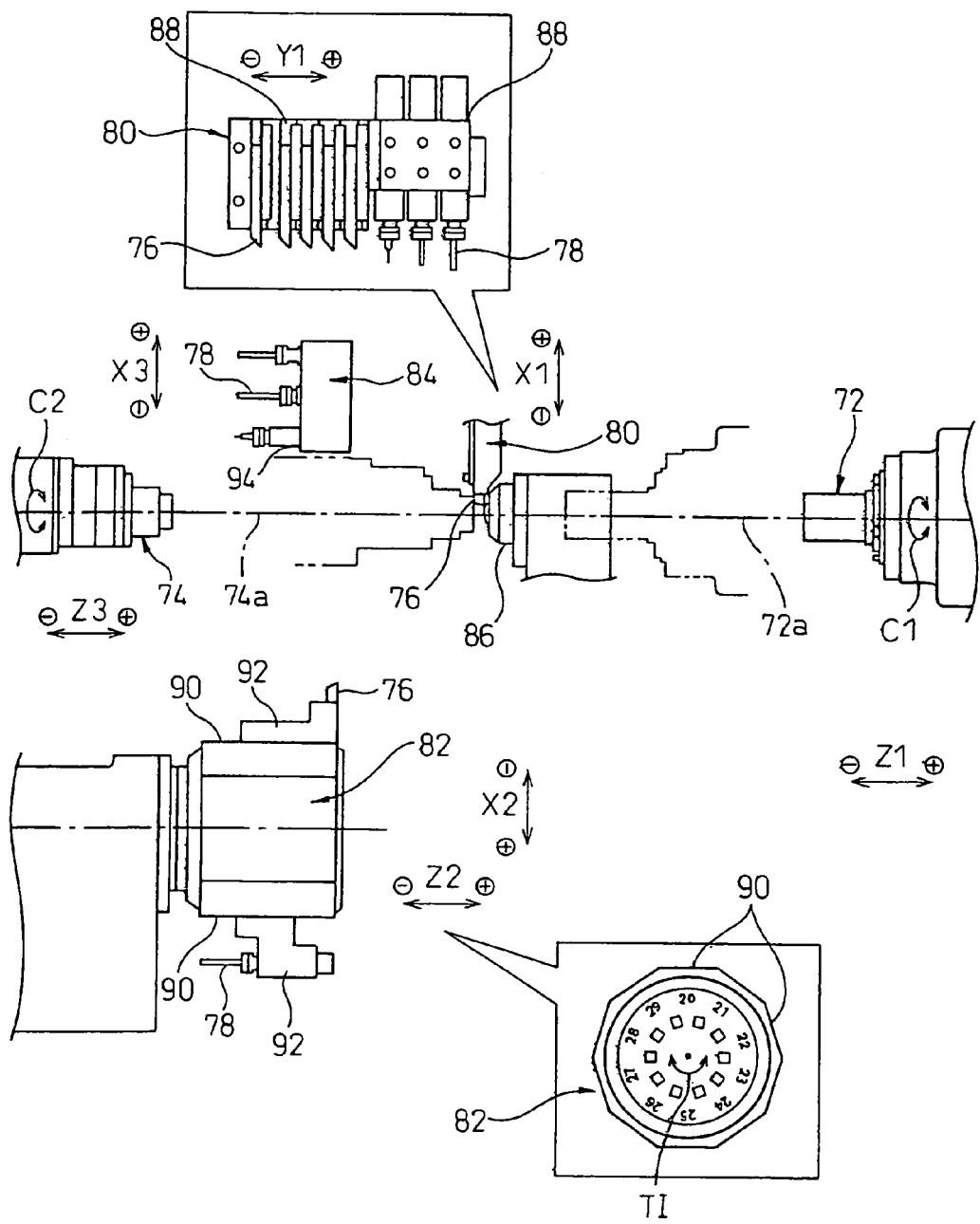
FIG. 13 is a view schematically showing the configuration of important parts of an NC lathe to which the automatic programming apparatus of FIG. 12 can be applied.

Here, an example of the basic thinking relating to the selective use of the three lines for improving the work efficiency in the mechanical configuration of the NC lathe shown in FIG. 13 will be briefly explained. For example, the first tool rest 80 (or gang) and the second tool rest 82 (or turret) are advantageously alternately used (that is, the tools are arranged) in the order of arrangement of the programs considering the fact that a relatively longer time is required for the tool selection operation in the second tool rest 82. At this time, if effectively using the third tool rest 84 ("Back 3") in the drilling and tapping in the back machining processes, the first tool rest 80 and the second tool rest 82 can be alternately used in the front machining processes during that time and therefore the tool selection time can be effectively reduced. Note that the ID and OD turning in the back machining processes can only be performed by tools on the second tool rest 82, so during that time the first tool rest 80 is used in the front machining processes. Further, the OD threading in the front machining processes requires repeated threading operations, so basically the second tool rest 82

(able to move in Z-axis) is used rather than the first tool rest 80 (unable to move in z-axis). If using the first tool rest 80 in the OD threading, since the first spindle 72 is made to move along the Z-axis, the operator preferably is aware that the length to be machined of the bar will be repeatedly pulled inside the guide bush 86.

In this way, when allocating the plurality of processes required for production of a machined product to a plurality of lines of an NC lathe, considering the work efficiency at the NC lathe, it is advantageous to set in advance a plurality of types of machining patterns suitably combining the first and second spindles 72 and 74 and the first to third tool rests 80, 82, and 84 for machining operations. Therefore, in the illustrated embodiment, such a plurality of types of machining patterns 106 (FIG. 12) are set in advance and stored in the storage unit 58, and the program allocation processing unit 60 performs processing to select several suitable machining patterns under the above designated allocation conditions and allocate the plurality of programs to the three lines of the NC lathe based on these selected machining patterns.

As examples of such machining patterns, in the illustrated embodiment, "twin turret machining", "two saddle machining", "front/back machining", "three-line machining", and "pick-off/center support", that is, five types of machining patterns, are stored in the storage unit 58. Twin turret machining is the most often used standard machining pattern. The program allocation processing unit 60 basically selects this machining pattern, then selects other machining patterns able to be combined with it. The machining work defined by the twin turret machining is front machining work alternately using the first tool rest 80 (gang) and second tool rest 82 (turret) in the line 1. During that time, it is possible to perform back machining by the third tool rest 84 ("Back 3") in the line 3. Twin saddle machining is a machining pattern performing simultaneous front machining such as rough/finishing machining or simultaneous thread cutting (different pitches) by the line 1 and line 2 or allocating the C1 axis positioning operation of the first spindle 72 to either the first tool rest 80 (line 1) or second tool rest 82 (line 2). During that time, it is possible to perform back machining using the third tool rest 84 by the line 3.

Front/back machining is a machining pattern where front machining and back machining are performed simultaneously independent from each other. When the plurality of processes includes a back machining process, the program allocation processing unit 60 basically selects this machining pattern. In front/back machining, it is possible to perform back machining alternately using the second tool rest 82 and the third tool rest 84 between the line 2 and line 3. Three-line machining selects the case of simultaneous machining (for example, front OD machining and front/back centering) in the three lines. In three-line machining, however, the third tool rest 84 cannot be used. Pick-off/center support selects the case of transfer of the bar from the first spindle 72 to the second spindle 74 and center support using the second spindle 74.

In this way, in the automatic programming apparatus 50, the plurality of processes are allocated to three lines based on preset machining patterns. The routine for determination of the most efficient combination of machining patterns differs somewhat depending on the existence of any back machining processes, however. Referring again to the flow charts of FIG. 14A and FIG. 14B, after the tool mounts 88 and 90 have finished being specified and the tool holders selected for all of the designated tools at steps P3 to P5, the control unit 56 judges whether there is any program for a back machining process in the plurality of programs at the next step P6. When there is a back machining process, it temporarily determines by which combination of machining patterns to perform all of the processes (step P7).

Further, after allocating the plurality of programs to the three lines based on the temporarily determined combination of machining patterns, the unit calculates the individual program execution times of the front machining processes and back machining process, restudies whether it is possible to change to a best combination of machining patterns further improved in efficiency (that is, increased in parallel work time) under the above designated allocation condition, and adopts the best combination of machining patterns when such a change is possible (step P8). On the other hand, when there is no program for a back machining process in the plurality of programs, the step of temporary determination of the machining patterns is unnecessary and the combination of machining patterns is immediately determined at step P8.

In this way, when the tool mounts 88 and 90 finish being specified and the tool holders selected and further the combination of the machining patterns is determined, the plurality of programs 62 stored in the storage unit 58 are allocated to the three lines of the NC lathe in the most advantageous form in terms of work efficiency (step P9). At this time, the program allocation processing unit 60 describes the tool management commands (or T codes) designating the tool mounts 88, 90, and 94 specified for the designated tools in the plurality of programs 62 stored in the storage unit 58. The determined T-codes and the corresponding names etc. of the designated tools and tool holders can be displayed on the display of the display unit 54 using for example the tool management determining screen 108 shown in FIG. 19.

Figure 20:
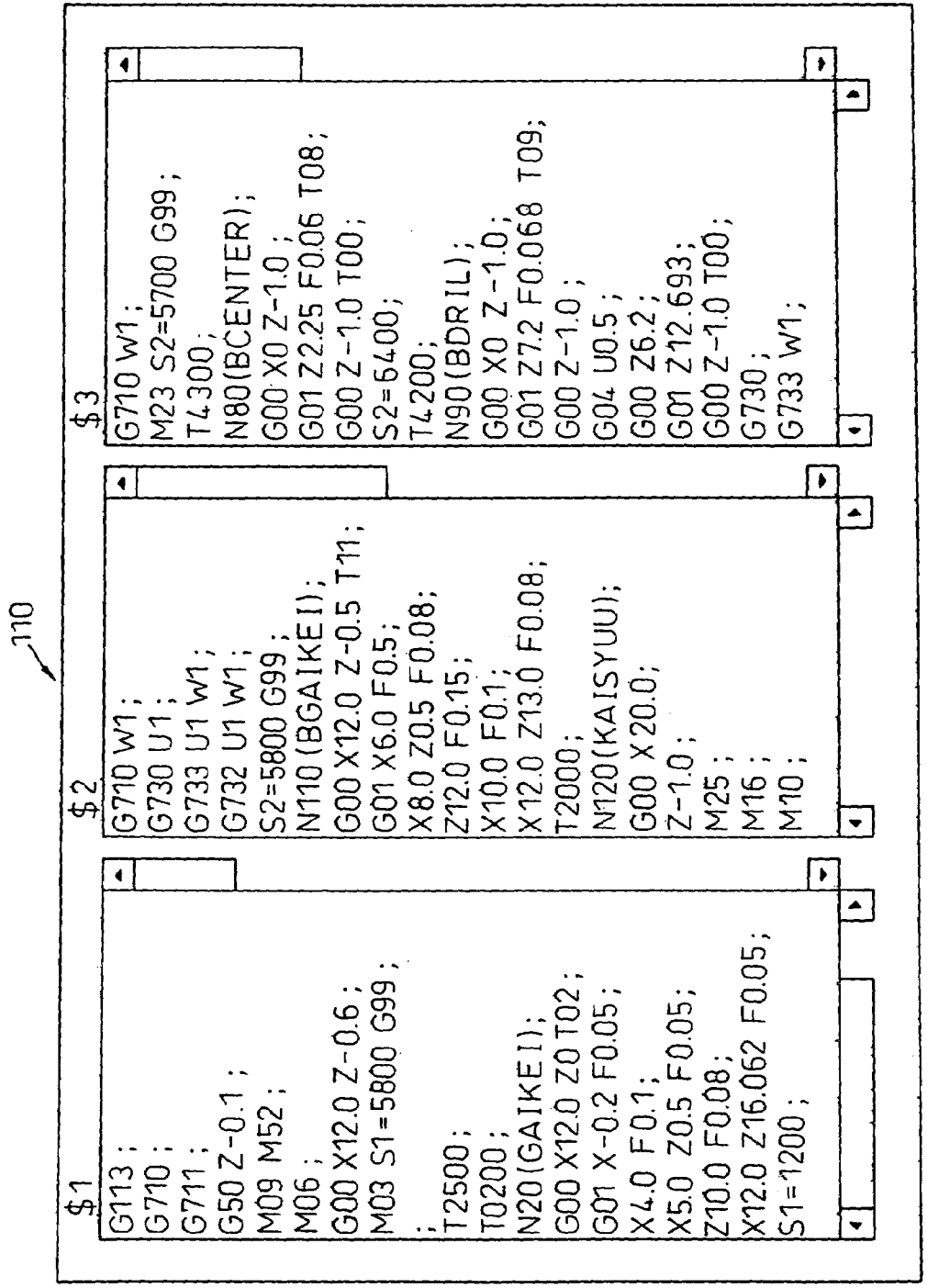
FIG. 20 is a view of a multi-line control program in the automatic programming apparatus of FIG. 12.

As explained above, the various tool holders used in the NC lathe have as attributes different inherent tool nose deviations (or shift values). Therefore, in the illustrated embodiment, at step P9, after the tool management commands in the individual machining programs are determined, the program allocation processing unit 60 reads the various tool nose deviations (or shift values) of the plurality of tool holders selected at steps P3 to P5 from the tool holder data 68 stored in the storage unit 58 and describes the position correction commands for the tool noses in the machining programs (step 10). In this way, the automatic production of the multi-line control program is completed. The produced multi-line control program can be displayed on the display of the display unit 54 using the multi-line control program screen 110 such as shown in FIG. 20.

The automatic programming apparatus 50 can have a graphic function for graphically displaying the multi-line control program automatically produced in this way on the display of the display unit 54 upon instruction of the operator. In this case, the storage unit 58 stores in advance a graphic screen for graphically displaying the multi-line control program, while the control unit 56 displays the plurality of programs allocated to the three lines by the program allocation processing unit 60 on the graphic screen arranged at a plurality of strips in time series for each of the lines. The graphic screen has the screen configuration shown in for example FIG. 21 and FIG. 22. The graphic screen 112 shown in FIG. 21 graphically displays the multi-line control program displayed at the multi-line control program screen 110 of FIG. 20. This multi-line control program is automatically produced under the allocation condition "giving priority to preset data of tool management" in accordance with the program production flow explained above.

As illustrated, in the program description region $1 in the graphic screen 112 corresponding to the line 1 of the NC lathe, the programs of the front machining processes (1) to (5) in the example of machining of FIG. 15 are arranged in the order of machining from the left to right in the figure in the form of a plurality of rectangular strips. In the displayed example, graphics indicating the contents of the programs are displayed immediately above the strips. The fact that the OD turning (1), D-cutting (3), cross centering (4), and cross drilling (5) are performed by the tools of the first tool rest 80 (gang), while the OD thread cutting (2) is performed by a tool on the second tool rest 82 (turret) will be understood at a glance along with the elapsed times of the processes. Further, a strip corresponding to the portion for operation of the first spindle 72 in the program of the cut-off/pick-off (6) is arranged behind (right in the figure) the group of strips of the front machining processes.

Further, in the program description region $3 corresponding to the line 3, the programs of the face centering (B-1), face drilling (B-2), and face tapping (B-3) in the back machining processes in the machining example of FIG. 15 are arranged in the order of machining from the left to the right of the figure in the form of a plurality of rectangular strips together with graphics illustrating the contents of the programs. These back machining processes are executed on the bar transferred from the first spindle 72 to the second spindle 74 through the pick-off process after the end of the front machining processes executed by the line 1. In the displayed example, the fact that these back machining processes all use the third tool rest 84 ("Back 3") will be understood from a glance along with the elapsed times of the processes. Further, a strip corresponding to the portion for operation of the second spindle 74 in the program of the cut-off/pick-off (6) is arranged behind (right side in the figure) the group of strips of the back machining processes. Note that the first and second machining processes in the line 1 are allocated to the machining pattern "twin turret machining", while the first to second back machining processes are allocated to the line 3 to be simultaneously machined in parallel with the two front machining processes.

Further, in the program description region $2 corresponding to the line 2, the program of the last OD turning (B-4) in the machining example of FIG. 15 and the program of the last back spindle separation are arranged in the order of machining from the left to the right of the figure in the form of a plurality of rectangular strips together with graphics illustrating the contents of the programs. In the displayed example, the fact that these back machining processes all use the second tool rest 82 (turret) will be understood from a glance along with the elapsed times of the processes. Further, the fact that these back machining processes at the line 2 are executed after suitable queuing after the end of the back machining processes in the line 3 will be understood at one glance. Note that the third to fifth front machining processes in the line 1, the third back machining process in the line 3, and the back machining process in the line 2 are allocated to the lines by the machining pattern of "front/back machining". Further, the fact that queuing processing is performed among the three lines even at the positions where the machining patterns are switched will also be understood. In this way, there is the advantage that by displaying a graph of the multi-line control program, any parallel or simultaneous nature and queuing among lines will be easily understood at one glance.

Figure 21:
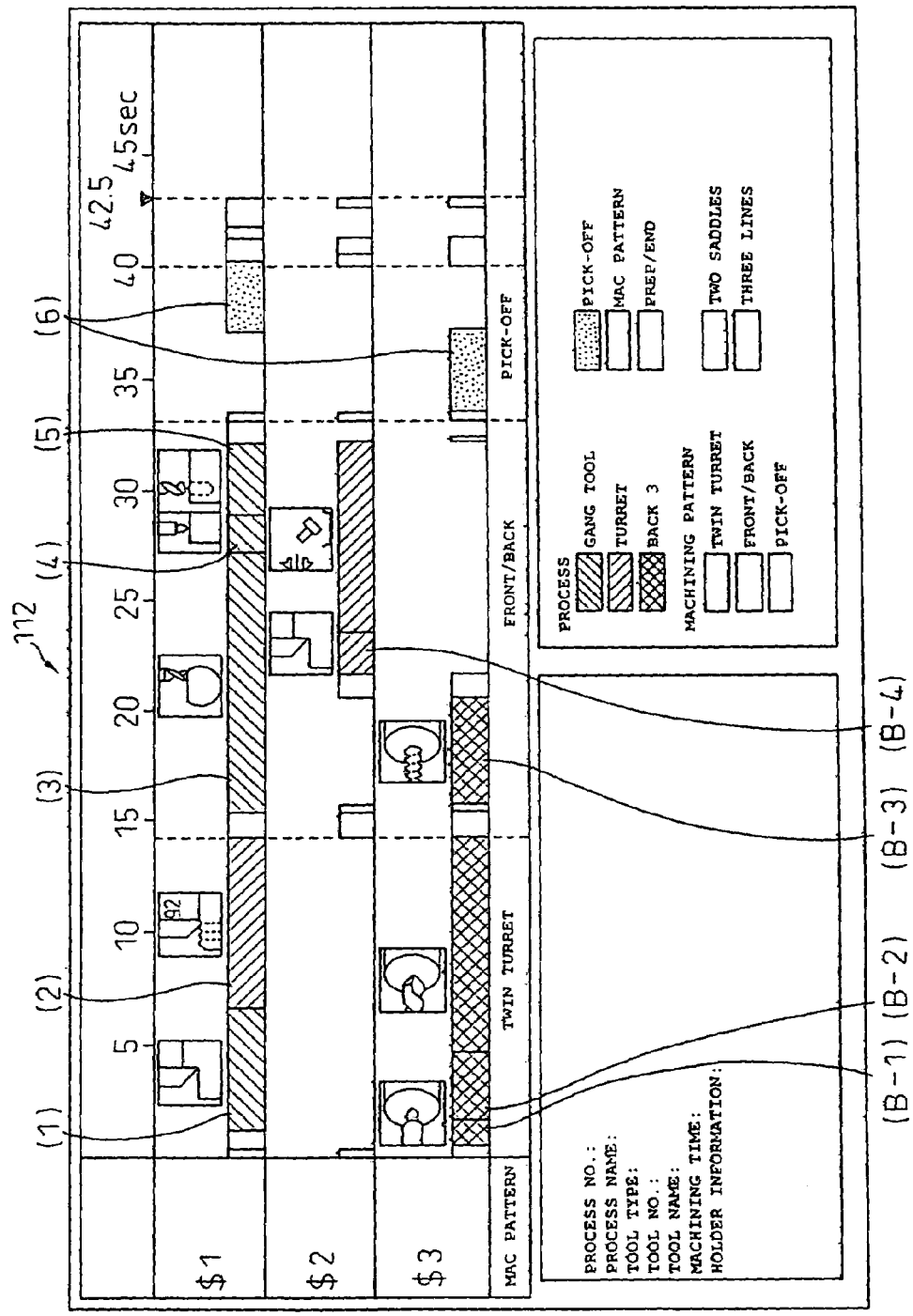
FIG. 21 is a view of a graphic screen displaying one multi-line control program prepared by the automatic programming apparatus of FIG. 12.
Figure 22:
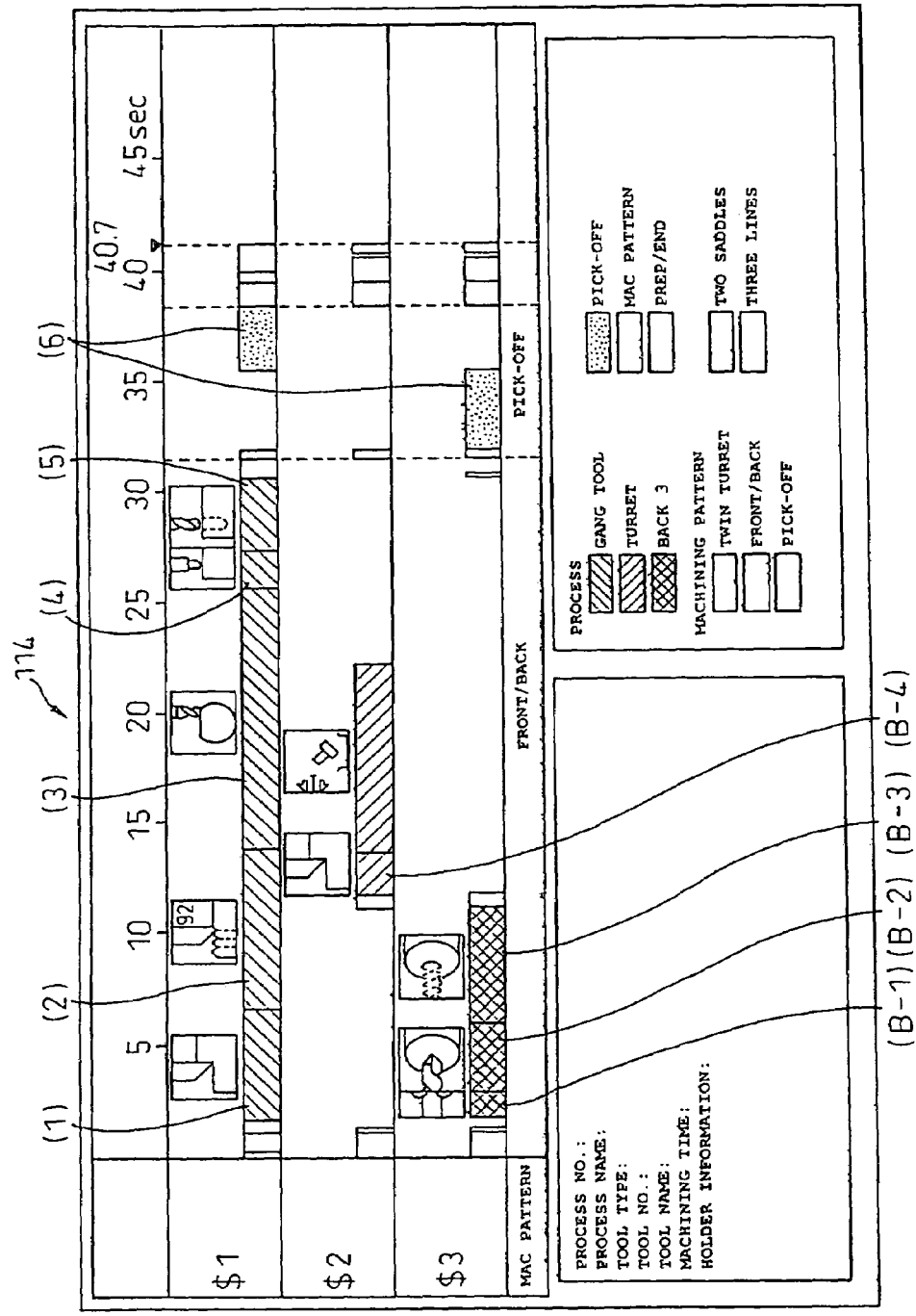
FIG. 22 is a view of a graphic screen displaying another multi-line control program prepared by the automatic programming apparatus of FIG. 12.

The multi-line control program displayed on the graphic screen 112 of FIG. 21 was, as explained above, produced with "giving priority to preset data of tool management" as the allocation condition. The OD threading (2) in the front machining process is executed by a tool on the second tool rest 82 (turret) in accordance with preset data designated by the operator. The cycle time in the multi-line control program is 42.5 seconds as illustrated. As opposed to this, the multi-line control program displayed on the graphic screen 114 of FIG. 22 was produced as a multi-line control program having the same group of processes as the multi-line control program of FIG. 21 but using "shortening the cycle time of the multi-line control program" as the allocation condition. In this multi-line control program, compared with the multi-line control program of FIG. 21, the cycle time is shortened to 40.7 seconds as illustrated as in the designated condition. The OD threading (2) in the front machining process, however, is executed using the first tool rest 80 (gang type) regardless of any preset data of the operator.

Note that in the automatic programming apparatus 50, it is advantageous if the system is designed so that the operator can suitably operate the input unit 52 and instruct a change of the combination of the machining patterns on the graphic screen displayed at the display unit 54. Due to this, it becomes possible to freely correct the automatically produced multi-line control program making use of the experience and knowledge of the operator.

In this way, according to the automatic programming apparatus 50, when producing a multi-line control program for executing a plurality of processes required for producing a single machined product in parallel by a plurality of lines of an NC machine tool, an operator does not have to study in detail which lines to allocate the individual processes to. Further, in the automatic programming apparatus 50, since the allocation of the plurality of designated tools to the plurality of tool mounts provided on one or more tool rests is determined automatically with reference to the number of the plurality of types of tool holders in stock for each type and their attributes and all processes are allocated to the plurality of lines in the most advantageous form in terms of work efficiency under the desired allocation condition, even an operator with little knowledge or experience can initiate automatic production of a multi-line control program superior in quality (length of cycle time, appropriateness of tool management, machining accuracy, etc.)

As clear from the above explanation, according to the present invention, there are provided an automatic programming method and automatic programming apparatus for automatically producing a multi-line control program to be executed by a multi-spindle, multi-line control NC machine tool which enable the plurality of processes required for production of a machined product to be efficiently and suitably automatically allocated to the plurality of lines and therefore enable quick automatic production of a high quality multi-line control program without being governed by the level of knowledge or experience of the operator.

Figure 23:
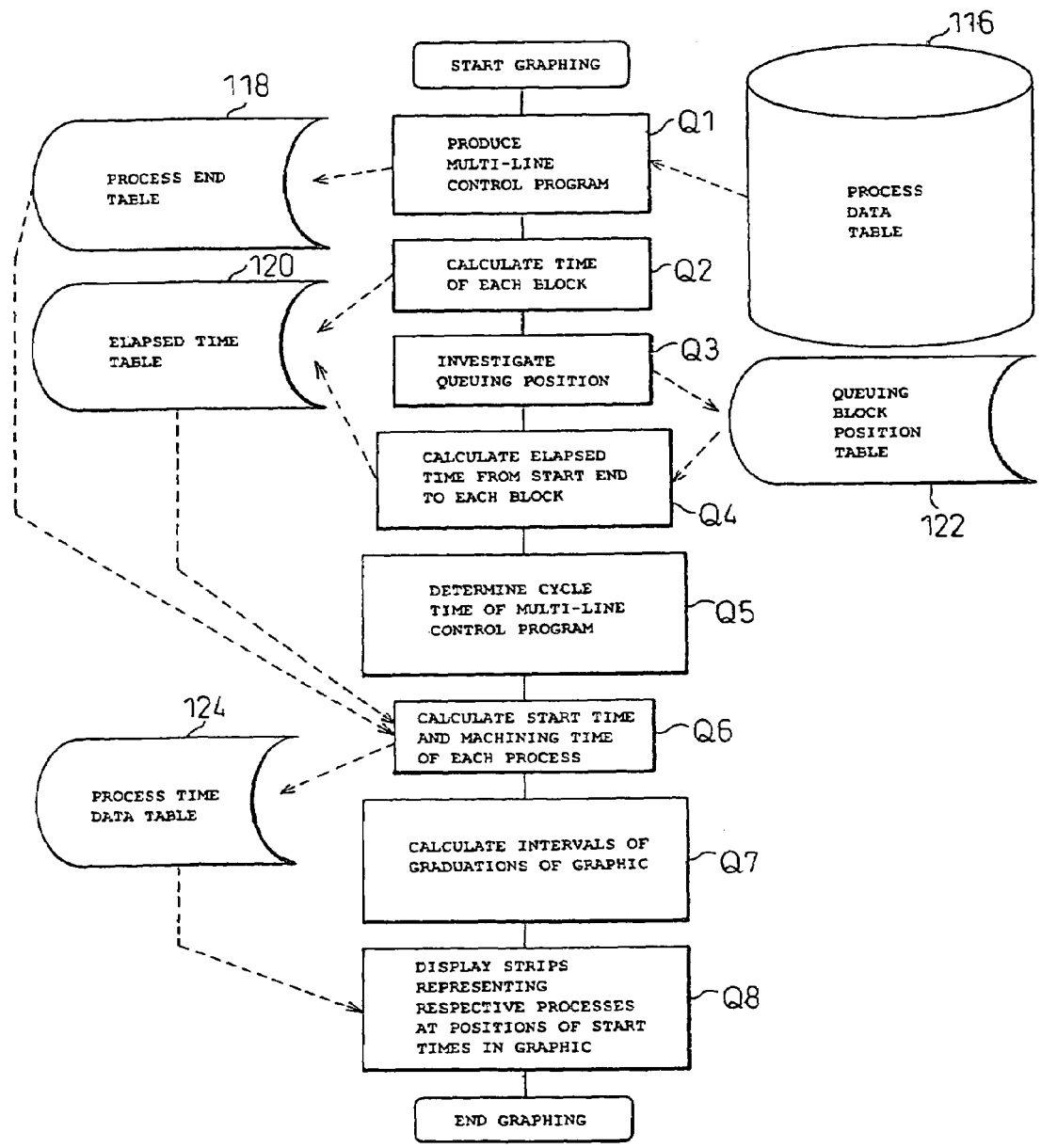
FIG. 23 is a flow chart of a program display processing method according to an embodiment of the present invention.

FIG. 23 is a flow chart showing a program display processing method according to an embodiment of the present invention. This program display processing method can be used as the processing method for graphically displaying the automatically produced multi-line control program on the display of the display unit 54 in the above-mentioned automatic programming apparatus 50. In this case, the processing in accordance with the illustrated flow chart is executed under the control of the control unit 56 of the automatic programming apparatus 50.

First, step Q1 comprises extracting and suitably processing required data from the process data table 116 registering various data relating to the plurality of processes required for machining a product and producing a multi-line control program allocating the programs corresponding to the plurality of processes to the plurality of lines. The data registered in the process data table 116 includes programs of individual processes, process numbers, process names, tool information (types, numbers and names), tool holder information, etc. Further, information such as the line no., the positions of the start blocks and the positions of the end blocks of the programs, etc. are taken out from the produced multi-line control program and registered in the end table 118 of the processes as data for clarifying the division between processes.

Here, when producing a multi-line control program by the above-mentioned automatic programming apparatus 50, the process data table 116 is stored in the storage unit 58 including the programs 62, tool data 64, tool mount data 66, tool holder data 68, tool management determining algorithms 70, etc. Further, the produced multi-line control program is stored in the storage unit 58, and the process end table 118 is stored in the storage unit 58.

Next, step Q2 comprises calculating the required execution time for the individual blocks in the programs in the multi-line control program based on the cutting speeds of the tools, distances of movement, etc. due to the programs. At this stage, the presence of any queuing time between the programs between lines is not considered. Further, the execution time for each block calculated is written into an elapsed time table 120. Note that the elapsed time table 120 can also be stored in the storage unit 58 of the automatic programming apparatus 50.

Step Q3 comprises investigating the queuing position of the blocks between lines in the multi-line control program and writing information such as the line no., queuing no., queuing block position, etc. in the queuing block position table 122. Note that the queuing block position table 122 can also be stored in the storage unit 58 of the automatic programming apparatus 50.

Next, step Q4 comprises successively adding the execution times of the individual blocks to individually calculate the elapsed times from the start of the series of programs of the lines, that is, the start of the programs, to each block. At this time, it fetches the information on the queuing block positions etc. written into the queuing block position table 122 and, when there is a queuing block in the middle of a program in one line, calculates and compares the elapsed time to the queuing block in that line and the elapsed time to the corresponding queuing block in another line. Further, it sets the longest elapsed time in the elapsed times as the starting time of the next block after that queuing block and, based on this, calculates the elapsed time of the succeeding blocks. The elapsed times for each block calculated in this way are registered in the elapsed time table 120.

Step Q5 comprises comparing the elapsed times of the final blocks of all lines calculated at step Q4 and defining the longest elapsed time as the cycle time of the multi-line control program. Next, step Q6 comprises calculating the program start time for each process and machining time in each line. At this time, it takes out and uses the required information from the process end table 118 and the elapsed time table 120. The start times and machining times of the processes calculated in this way are registered in the process time data table 124. Note that the process time data table 124 can also be stored in the storage unit 58 of the automatic programming apparatus 50.

Step Q7 comprises calculating the intervals of the time graduations at the graphic screen based on the cycle time determined at step Q5 so as to enable the display of the entire graphed multi-line control program within the display screen for showing the program (for example, the display of the display unit 54 of the automatic programming apparatus 50). Next, step Q8 comprises displaying rectangular strips expressing the individual processes positioned with their start times in the corresponding lines with reference to the time graduations calculated at step Q7 based on the data of the start times and machining times of the processes registered in the process time data table 124. The lengths of the strips displayed in this way in the graduation direction express the machining time. In this way, the graphic display of the multi-line control program ends.

Figure 24A:
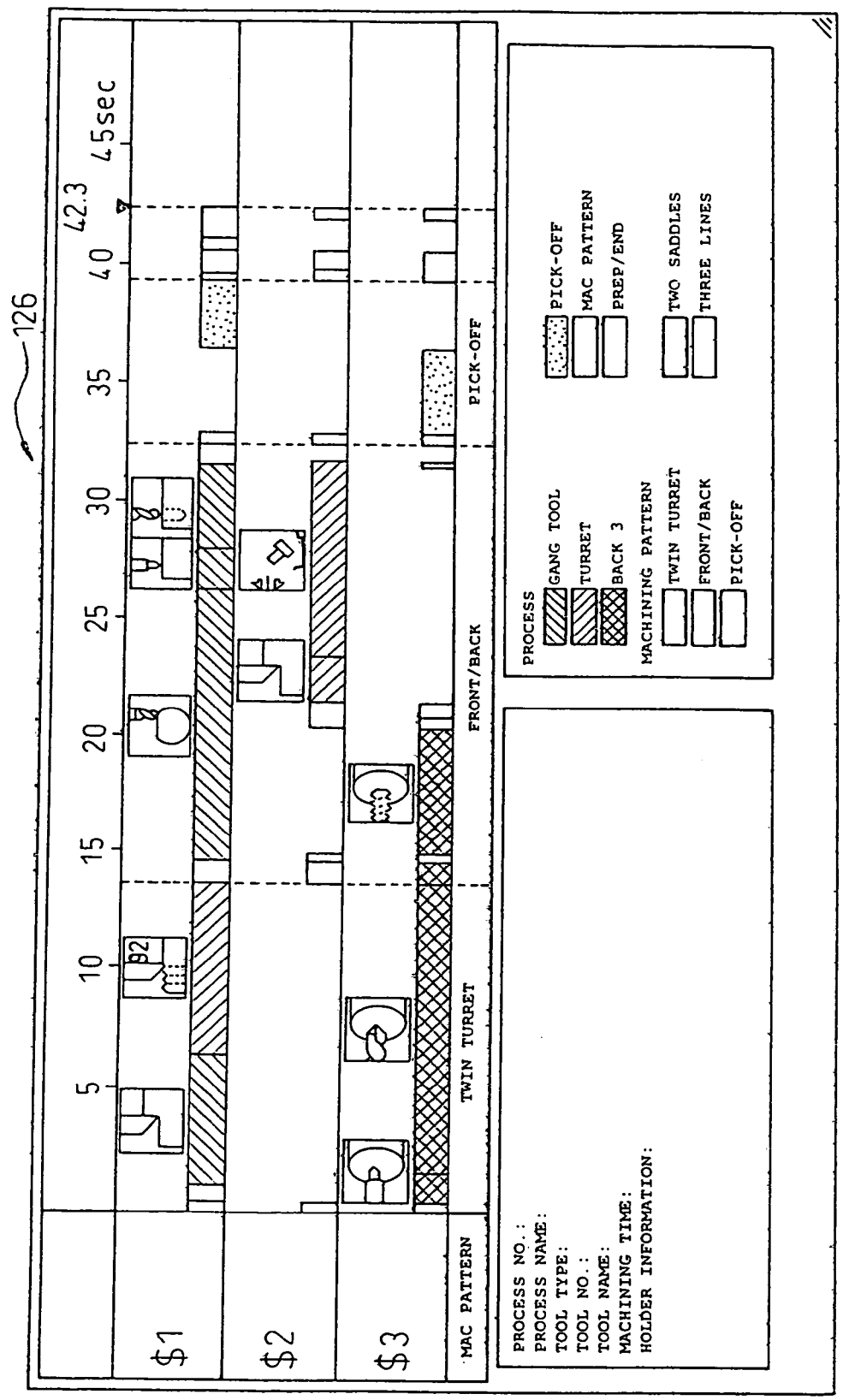
FIG. 24A and FIG. 24B are views of graphic screens displayed by the program display processing method of FIG. 23.

FIG. 24A is a view of an example of a graphic screen 126 obtained by the above program display processing method. This graphic screen 126 displays the multi-line control program of the example of machining the product of FIG. 15 produced by the automatic programming apparatus 50 on the display of the display unit 54 and is similar to the graphic screens 112 and 114 shown in FIG. 21 and FIG. 22. Note that in the screen, the broken lines led in the vertical direction across the three lines show the queuing positions between lines when the machining patterns are changed, while the graduations of the ordinate show units of seconds.

Figure 24B:
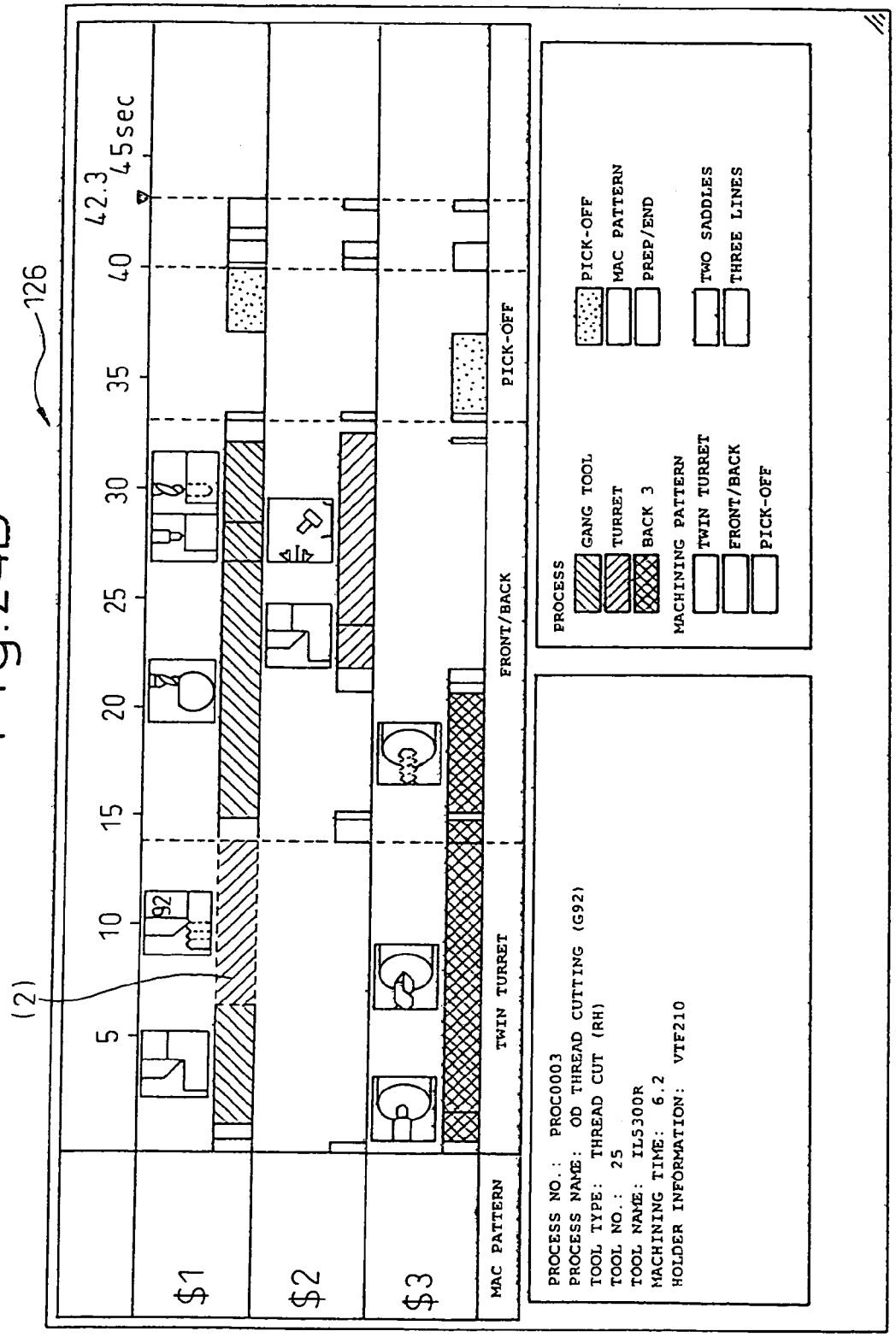

FIG. 24B shows the state when an operator instructs a strip (for example, clicks on it by the mouse) expressing a desired process (in the figure, the OD threading (2)) by the graphic screen 126 of FIG. 24A. In this state, as illustrated, it is advantageous to display the required time, number, and name of the instructed process, the type, number, and name of the tool used, and the tool holder information in the process information display field provided at the bottom left area of the graphic screen 126.

In this way, according to the program display processing method according to the present invention, by displaying the multi-line control program on a graphic screen, it is possible to confirm at a single glance the required time of each process and the queuing times between lines in the multi-line control program from the state of the corresponding rectangular strips. Therefore, the operator can easily confirm the content of the produced machining program and can easily optimize the programming for the purpose of for example shortening the machining time. Further, it can judge whether the order of execution of the plurality of processes for producing a single machined product can be changed and predict the effect of the change of the order of the processes on the series of machining programs as a whole.

In the above program display processing method, when graphically displaying the multi-line control program produced by the automatic programming apparatus 50, enabling the operator to instruct a change of the combination of the above machining patterns on the displayed graphic screen is advantageous in terms of enabling the multi-line control program to be corrected making use of the experience and knowledge (knowhow) of the user.

Figure 25:
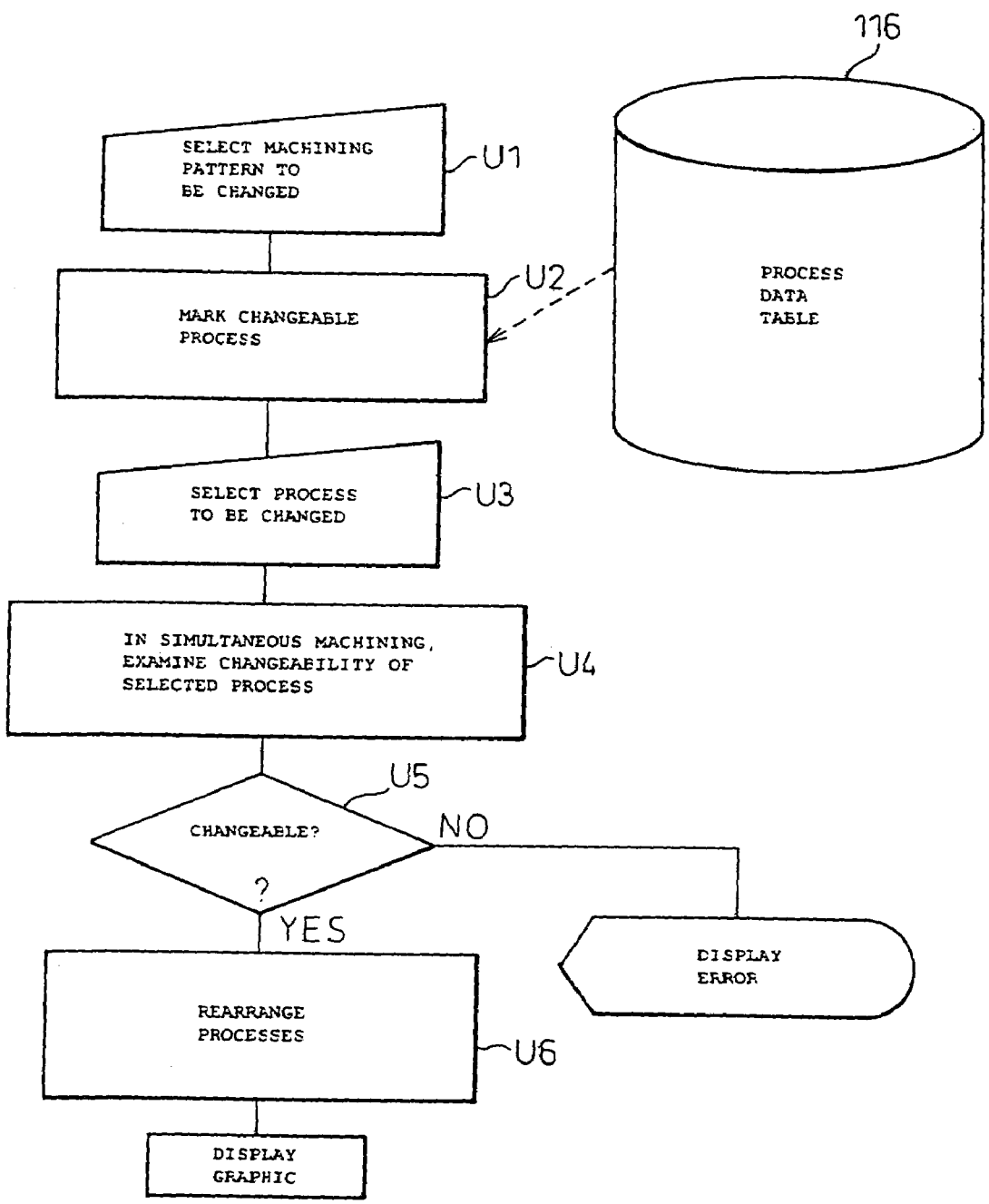
FIG. 25 is a flow chart of a program display processing method according to another embodiment of the present invention.

FIG. 25 is a flow chart of a program display processing method according to another embodiment of the present invention for changing the combination of machining patterns. This program display processing method is used as the processing method when the above-mentioned automatic programming apparatus 50 graphically displays the automatically produced multi-line control program on the display of the display unit 54 and for example can be supplementarily executed for the graphic screen produced by the program display processing method shown in FIG. 23.

Therefore, the processing in accordance with the illustrated flow chart is executed under the control of the control unit 56 of the automatic programming apparatus 50.

First, step U1 comprises selecting and designating a changed machining pattern on the graphic screen displaying the multi-line control program (for example, graphic screen 126 of FIG. 24A) when there is a process on the screen for which change to another machining pattern is believed desirable. For example, the operator designates the desired machining pattern among the five machining patterns displayed at the bottom right area of the screen in the graphic screen 126 (for example, double clicks on the square space to the left of the selected machining pattern).

Next, step U2 comprises searching for processes which can be changed to the designated machining pattern and attaches marks to the rectangular strips showing the processes on the screen. For example, on the graphic screen 126, the display colors of the strips showing the changeable processes are automatically changed. Note that in this process search step, it is possible to extract and search for the required data from the above-mentioned process data table 116. Next, step U3 comprises instructing the marked processes on the screen. For example, the strips of the changeable processes are clicked on at the graphic screen 126.

Figure 26:
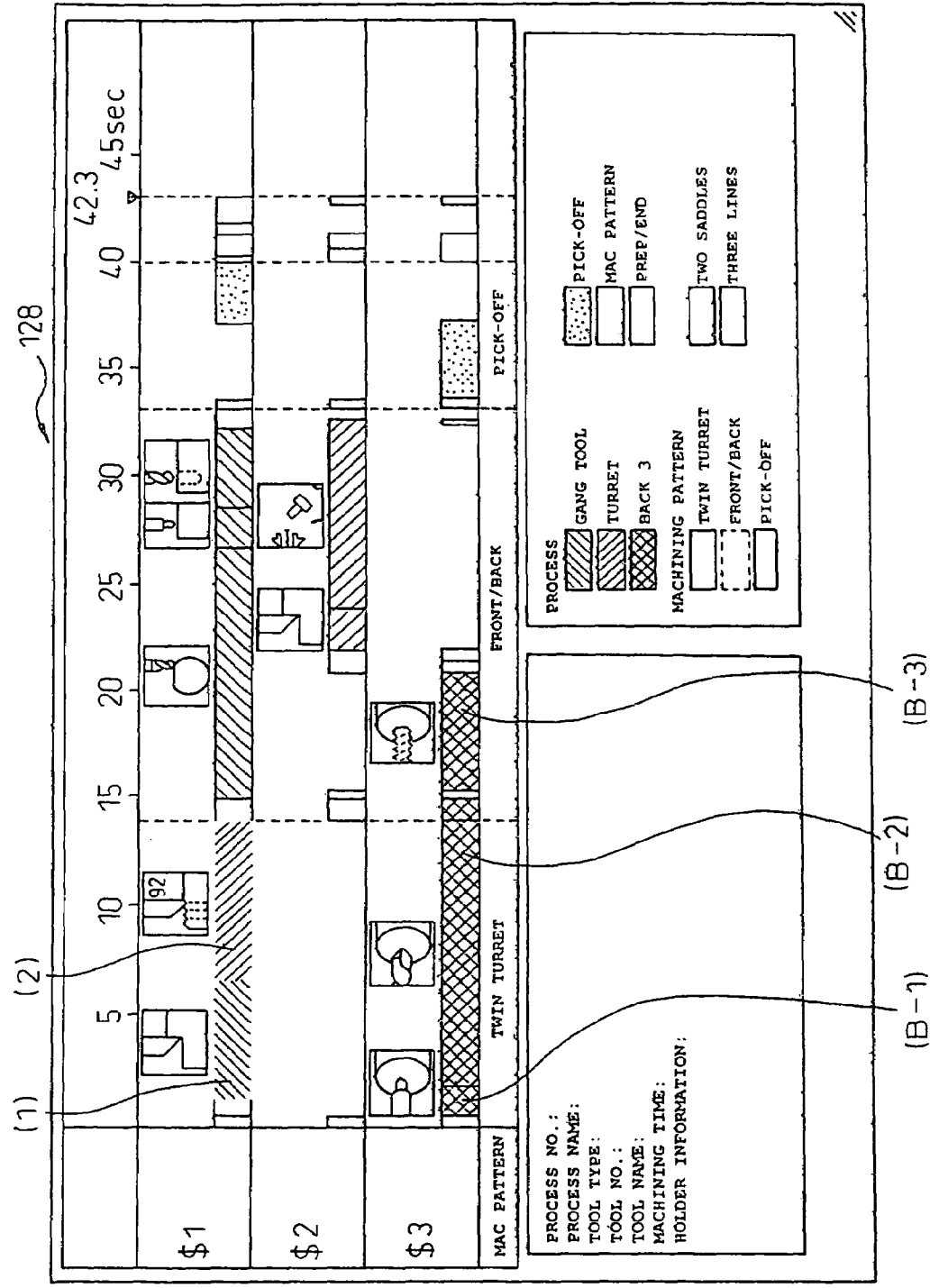
FIG. 26 is a view of a graphic screen before change by the program display processing method of FIG. 25.

FIG. 26 shows a graphic screen 128 after designating the changed machining pattern for the graphic screen 12-6 and instructing the processes able to be changed to the machining pattern. On this graphic screen 128, "front/back machining" is designated as the changed machining pattern. Due to this, the frames surrounding the strips showing the OD turning (1) and OD threading (2) instructed are removed.

When the changed machining pattern is a machining pattern for simultaneous machining, step U4 comprises examining if the machining pattern of the instructed processes can be changed to a simultaneous machining type. That is, it comprises automatically studying at the control unit 6 if the processes can be performed simultaneously with other processes, if the rotational speed and other cutting conditions match between two processes, and if the relationship of the machining positions between the two processes is suitable. If it is judged that it cannot be changed as a result, step U5 proceeds to the display of an error message. Only if it is judged that it can be changed does the routine proceed to the next step U6.

Step U6 comprises rearranging the group of processes in the multi-line control program corresponding to the change of the instructed machining pattern. That is, it automatically performs the work of inserting the then required queuing blocks into the series of programs of the lines or reassigning the used tools corresponding to the change in the machining pattern under the control of the control unit 56. In this way, the graphic display of the multi-line control program changed in the machining pattern ends.

Figure 27:
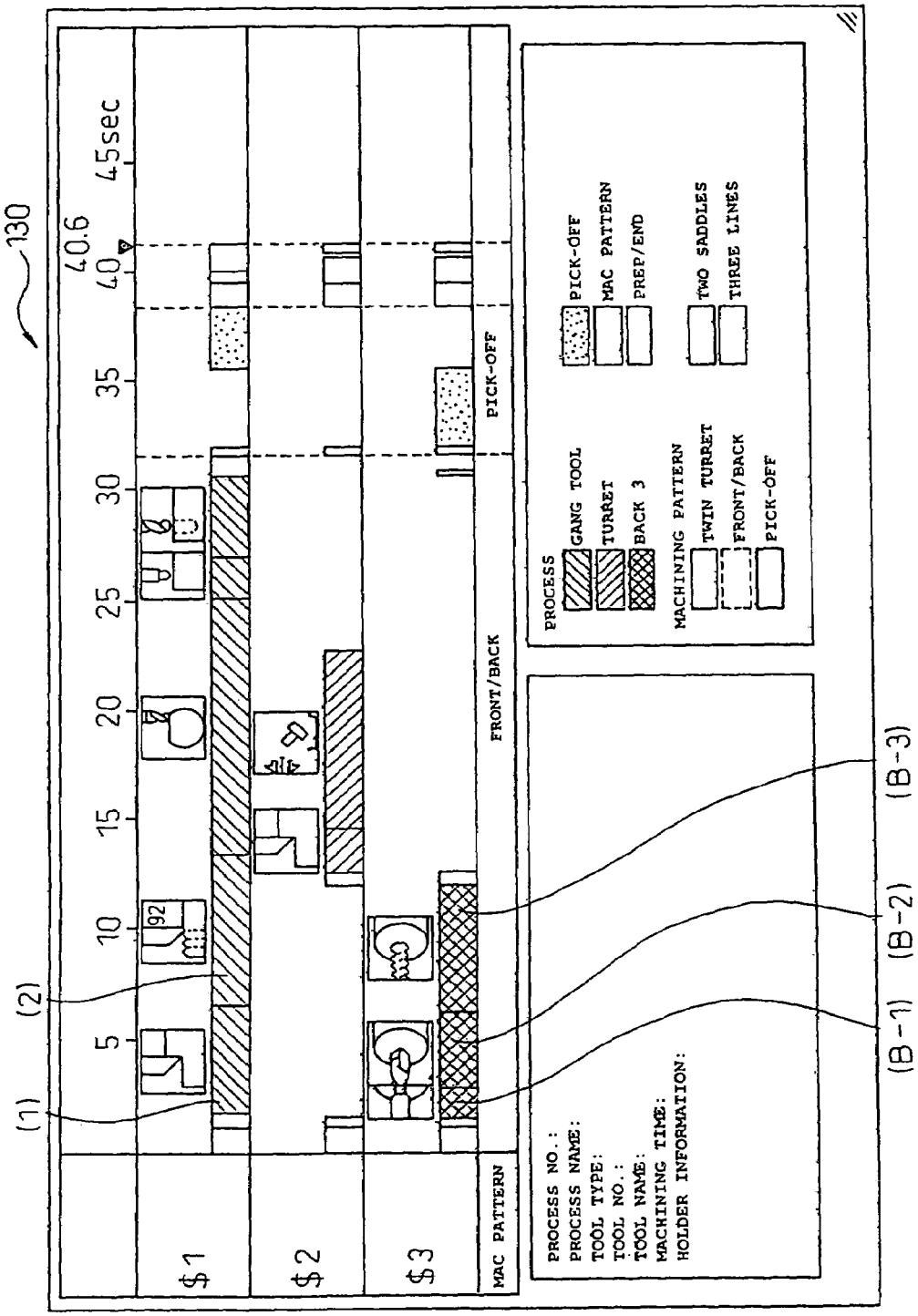
FIG. 27 is a view of a graphic screen changed by the program display processing method of FIG. 25.

FIG. 27 shows a graphic screen 130 displaying a multi-line control program after changing a machining pattern for the graphic screen 128 of FIG. 26 by the above program display processing method. In this graphic screen 130, the OD turning (1) and OD threading (2) in the line $1 and the face centering (B-1) and face drilling (B-2) in the line $3 are programmed to be executed by the "front/back machining" pattern together with the later face tapping (B-3) in the line $3. As a result, the cycle time of the multi-line control program is reduced from 42.3 seconds (FIG. 26) to 40.6 seconds.

In this way, according to the program display processing method according to the present invention, by the operator performing suitable operations on a graphic screen displaying a multi-line control program, it is possible to easily correct a multi-line control program by making use of the experience and knowledge (knowhow) of the user.

Above, preferred embodiments of the present invention were explained, but the present invention is not limited to the above embodiments and can be changed and modified in various ways within the scope of disclosure of the claims.

The invention claimed is:

1. An automatic programming method for automatically producing a multi-line control program executed in an NC machine tool provided with at least one spindle and at least one tool rest, both operable under control in a plurality of lines, comprising:

individually preparing and previously registering a plurality of programs for controlling a plurality of processes required to manufacture a machined product in said NC machine tool, without considering allocation of the programs to said plurality of lines;

previously registering tool data relating to attributes of a plurality of types of tools capable of being used in a plurality of types of cutting processes capable of being performed in said NC machine tool;

previously registering tool mount data relating to positions, in said at least one tool rest, of a plurality of sets of tool mounts provided in said at least one tool rest;

previously registering a tool holder data relating to attributes of a plurality of types of tool holders capable of being installed onto said tool mounts;

previously setting and registering a tool management determining algorithm used for allocating mounting locations of a plurality of designated tools, designated in said plurality of programs, for said tool mounts, provided that some of said programs are executed simultaneously in at least two lines among said plurality of lines;

specifying a plurality of tool mounts, as said mounting locations of designated tools, allowing execution of a program associated with said designated tools, among said plurality of tool mounts, on the basis of said tool data and said tool mount data, and selecting a plurality of tool holders used for mounting said designated tools correspondingly onto said plurality of tool mounts as specified, on the basis of said tool data and said tool holder data, in accordance with said tool management determining algorithm; and describing a command, designating said plurality of tool mounts as specified, into said plurality of programs, after the selecting of a plurality of tool holders is completed, and automatically allocating said plurality of programs to said plurality of lines.

2. An automatic programming method as set forth in claim 1, further comprising, prior to the allocating of said plurality of programs to said plurality of lines, selecting either one of three allocation conditions such as a preset data priority of tool management, a cycle time reduction of a multi-line control program and an improvement of machining accuracy; wherein said plurality of programs are automatically allocated to said plurality of lines under an allocation condition as selected.

3. An automatic programming method as set forth in claim 1, further comprising, prior to the allocating of said plurality of programs to said plurality of lines, previously setting and registering a plurality of types of machining patterns for causing machining operations in a suitable combination of said at least one spindle and said at least one tool rest; wherein said plurality of programs are automatically allocated to said plurality of lines on the basis of some machining patterns selected from said plurality of types of machining patterns.

4. An automatic programming method as set forth in claim 1, wherein said tool holder data includes an offset value of a tool nose inherent in each of said plurality of types of tool holders; and further comprising, after the selecting of said plurality of tool holders, describing a command of position compensation into said plurality of programs, on the basis of said offset value of tool nose of each of said tool holders as selected.

5. An automatic programming method as set forth in claim 1, wherein said tool holder data includes numbers of said plurality of types of tool holders in stock, prepared respectively for the attributes of the holders; and wherein said plurality of tool holders are selected under consideration of said numbers in stock.

6. An automatic programming apparatus for automatically producing a multi-line control program to be executed in an NC machine tool provided with at least one spindle and at least one tool rest, both operable under control in a plurality of lines, comprising:

a storage unit previously storing a plurality of programs individually prepared for controlling a plurality of processes required to manufacture a machined product in said NC machine tool, without considering allocation of the programs to said plurality of lines; tool data relating to attributes of a plurality of types of tools capable of being used in a plurality of types of cutting processes capable of being performed in said NC machine tool; tool mount data relating to positions, in said at least one tool rest, of a plurality of tool mounts provided in said at least one tool rest; tool holder data relating to attributes of a plurality of types of tool holders capable of being installed onto said tool mounts; and a tool management determining algorithm used for allocating mounting locations of a plurality of designated tools, designated in said plurality of programs, for said tool mounts, provided that some of said programs are executed simultaneously in at least two lines among said plurality of lines;

a program allocation processing unit specifying a plurality of tool mounts, as said mounting locations of designated tools, allowing execution of a program associated with said designated tools, among said plurality of tool mounts, on the basis of said tool data and said tool mount data stored in said storage unit, and selecting a plurality of tool holders used for mounting said designated tools correspondingly onto said plurality of tool mounts as specified, on the basis of said tool data and said tool holder data stored in said storage unit, in accordance with said tool management determining algorithm; said program allocation processing unit describing a command, designating said plurality of tool mounts as specified, into said plurality of programs, after the selecting of a plurality of tool holders is completed, and automatically allocating said plurality of programs to said plurality of lines.

7. An automatic programming apparatus as set forth in claim 6, further comprising an input unit accepting a designation for selecting either one of three allocation conditions such as a preset data priority of tool management, a cycle time reduction of multi-line control program, and an improvement of machining accuracy; wherein said program allocation processing unit automatically allocates said plurality of programs to said plurality of lines under an allocation condition as selected through said input unit.

8. An automatic programming apparatus as set forth in claim 6, wherein said storage unit previously stores a plurality of types of machining patterns for causing machining operations in a suitable combination of said at least one spindle and said at least one tool rest; and wherein said program allocation processing unit automatically allocates said plurality of programs to said plurality of lines on the basis of some machining patterns selected from said plurality of types of machining patterns stored in said storage unit.

9. An automatic programming apparatus as set forth in claim 6, wherein said tool holder data stored in said storage unit includes an offset value of a tool nose inherent in each of said plurality of types of tool holders; and wherein said program allocation processing unit reads, after the selecting of said plurality of tool holders is completed, said offset value of tool nose in each of said tool holders as selected, from said tool holder data, and describes a command of position compensation into said plurality of programs, on the basis of said offset value of tool nose as read.

10. An automatic programming apparatus as set forth in claim 6, wherein said tool holder data stored in said storage unit includes numbers of said plurality of types of tool holders in stock, prepared respectively for the attributes of the holders; and wherein said program allocation processing unit specifies said plurality of tool mounts and selects said plurality of tool holders, under consideration of said numbers in stock read from said tool holder data.

* * * * *